United States Patent
Wu et al.

(10) Patent No.: US 8,358,649 B2
(45) Date of Patent: Jan. 22, 2013

(54) METHODS FOR HANDLING PACKET-SWITCHED DATA TRANSMISSIONS BY MOBILE STATION WITH SUBSCRIBER IDENTITY CARDS AND SYSTEMS UTILIZING THE SAME

(75) Inventors: Jing-Yi Wu, Ilan Hsien (TW); Chen-Hsuan Lee, Taipei (TW); Li-Chi Huang, Taipei Hsien (TW); Ying-Chieh Liao, Taipei (TW)

(73) Assignee: Mediatek Inc., Hsinchu (TW)

( * ) Notice: Subject to any disclaimer, the term of this patent is extended or adjusted under 35 U.S.C. 154(b) by 709 days.

(21) Appl. No.: 12/463,592

(22) Filed: May 11, 2009

(65) Prior Publication Data

US 2010/0027534 A1 Feb. 4, 2010

Related U.S. Application Data

(60) Provisional application No. 61/085,469, filed on Aug. 1, 2008.

(51) Int. Cl.
*H04L 12/66* (2006.01)
(52) U.S. Cl. ........................................................ 370/355
(58) Field of Classification Search .................. None
See application file for complete search history.

(56) References Cited

U.S. PATENT DOCUMENTS

| | | | |
|---|---|---|---|
| 7,466,674 B2 | 12/2008 | Okagawa et al. | |
| 8,139,587 B2 | 3/2012 | Larsson et al. | |
| 2003/0031150 A1 | 2/2003 | Yukie | |
| 2003/0088767 A1 | 5/2003 | Emerson, III | |
| 2003/0125073 A1 | 7/2003 | Tsai et al. | |
| 2005/0176466 A1* | 8/2005 | Verloop et al. | 455/558 |
| 2008/0293394 A1* | 11/2008 | Silver et al. | 455/417 |
| 2011/0281589 A1 | 11/2011 | De Beer | |

FOREIGN PATENT DOCUMENTS

| | | |
|---|---|---|
| CN | 1496154 | 5/2004 |
| CN | 101103597 | 1/2008 |
| WO | WO 2006/052171 | 5/2006 |

* cited by examiner

*Primary Examiner* — Chirag Shah
*Assistant Examiner* — Minh-Trang Nguyen
(74) *Attorney, Agent, or Firm* — McClure, Qualey & Rodack, LLP

(57) ABSTRACT

A system for handling packet-switched data transmission is provided. The system includes a first RF module, a second RF module, a first subscriber identity card camping on a cell via the first RF module, a second subscriber identity card camping on the same cell or a different cell via the second RF module and a load balancing unit. The load balancing unit receives an uplink IP packet, determines one subscriber identity card from the first and second subscriber identity cards when the uplink IP packet comprises information regarding an unestablished connection of a recognized application, and transmits the uplink IP packet to a destination via the determined subscriber identity card and the RF module corresponding to the determined subscriber identity card.

18 Claims, 18 Drawing Sheets

| Port number | Service type |
|---|---|
| 20 | FTP (data) |
| 21 | FTP (control) |
| 25 | SMTP |
| 80 | HTTP |
| 110 | POP3 |
| 143 | IMAP4 |
| 220 | IMAP |
| 443 | HTTPS |
| 465 | SMTP over SSL/TLS |
| 989 | FTP (data) over SSL/TLS |
| 990 | FTP (control) over SSL/TLS |
| 993 | IMAP4 over SSL |
| 995 | POP3 over SSL |
| 2948 | WAP |

FIG. 13

| Source IP address | Source port# | Destination IP address | Destination port# | Subscriber identity card |
|---|---|---|---|---|
| 192.192.1.128 | 80 | 200.1.1.1 | 80 | Card A |
| 192.192.1.128 | 20 | 200.1.1.1 | 20 | Card B |
| 192.192.1.128 | 99 | 220.196.1.1 | 993 | Card B |

FIG. 14

METHODS FOR HANDLING PACKET-SWITCHED DATA TRANSMISSIONS BY MOBILE STATION WITH SUBSCRIBER IDENTITY CARDS AND SYSTEMS UTILIZING THE SAME

CROSS REFERENCE TO RELATED APPLICATIONS

This application claims the benefit of U.S. Provisional Application No. 61/085,469, filed on Aug. 1, 2008, the entirety of which is incorporated by reference herein.

BACKGROUND OF THE INVENTION

1. Field of the Invention

The invention relates to a method for handling packet-switched data transmissions by a mobile station, and more particularly to a method for handling packet-switched data transmissions by a mobile station with multiple subscriber identity cards.

2. Description of the Related Art

Currently, the Global System for Mobile communication (GSM) standard is the popular standard for mobile phones in the world. The GSM standard, standardized by the European Telecommunication Standards Institute (ETSI) is a cellular network structure and a Time Division Multiple Access (TDMA) system. For a carrier frequency, the TDMA system will divide a frame into eight time slots, wherein each time slot is used to transmit a channel data for a subscriber. Meanwhile, the General Packet Radio Service (GPRS) technology is one of the available technologies of a GSM system. The GPRS technology utilizes the unused channels in the GSM system to provide moderate speed data transmissions. The Wideband Code Division Multiple Access (W-CDMA) is a wideband spread-spectrum mobile air interface that utilizes the direct-sequence spread spectrum method of asynchronous code division multiple access to achieve higher speeds and support more users compared to the implementation of time division multiplexing (TDMA) used by GSM systems. Time Division-Synchronous Code Division Multiple Access (TD-SCDMA) is another type of 3G mobile telecommunications standard.

A dual SIM mobile phone is a phone with two Subscriber Identity Modules (SIMs), which correspond to different telephone numbers. The dual SIM mobile phone allows a user to use two communication services without carrying two phones at the same time. For example, the same mobile phone may be used for business and private use with separate numbers and bills, thus providing convenience to mobile phone users.

BRIEF SUMMARY OF THE INVENTION

Systems for handling packet-switched data transmission are provided. An exemplary embodiment of a system for handling packet-switched data transmissions is provided. The system comprises a first RF module, a second RF module, a first subscriber identity card camping on a cell via the first RF module, a second subscriber identity card camping on the same cell or a different cell via the second RF module, and a load balancing unit. The load balancing unit receives an uplink IP packet, determines one subscriber identity card from the first and second subscriber identity cards when the uplink IP packet comprises information regarding an unestablished connection of a recognized application, determines a default subscriber identity card from the first and second subscriber identity cards when all port numbers present in the uplink IP packet are not recognized, determines one subscriber identity card previously utilized when detecting that a former IP packet comprising the same connection as that of the uplink IP packet, and transmits the uplink IP packet to a destination via the determined subscriber identity card and the RF module corresponding to the determined subscriber identity card. The application corresponds to a port number, and the connection is a combination of a source address, a destination address, a source port number and a destination port number of the uplink IP packet.

Moreover, another exemplary embodiment of a system for handling packet-switched data transmissions is provided. The system comprises a first RF module, a second RF module, a first subscriber identity card camping on a cell via the first RF module, a second subscriber identity card camping on the same cell or a different cell via the second RF module and a load balancing unit. The load balancing unit receives an uplink IP packet, determines one subscriber identity card from the first and second subscriber identity cards when the uplink IP packet comprises information regarding an unestablished connection of a recognized application, and transmits the uplink IP packet to a destination via the determined subscriber identity card and the RF module corresponding to the determined subscriber identity card.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 13 shows a table illustrating mappings between port numbers and service types;

FIG. 14 shows a table illustrating exemplary established connection records;

DETAILED DESCRIPTION OF THE INVENTION

Figure 1:
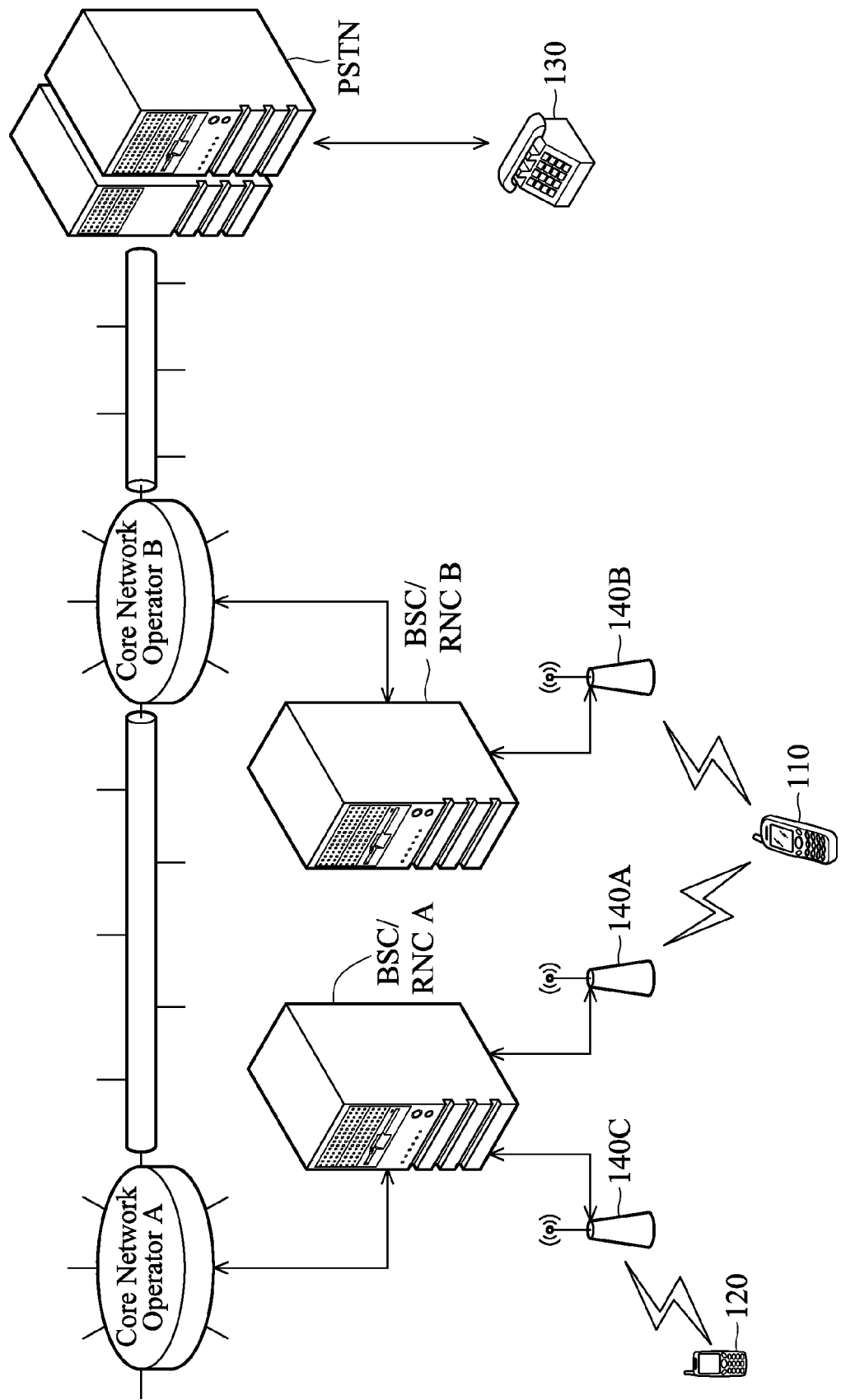
FIG. 1 shows a schematic diagram of a mobile communication network system.

The following description is of the best-contemplated mode of carrying out the invention. This description is made for the purpose of illustrating the general principles of the invention and should not be taken in a limiting sense. The scope of the invention is best determined by reference to the appended claims.

A subscriber identity module (SIM) card typically contains user account information, an international mobile subscriber identity (IMSI) and a set of SIM application toolkit (SAT) commands and provides storage space for phone book contacts. A micro-processing unit (MCU) of the Baseband chip (simply referred to as a Baseband MCU hereinafter) may interact with MCUs of the SIM cards (each simply referred to as a SIM MCU hereinafter) to fetch data or SAT commands from the plugged in SIM cards. A mobile station (MS) is immediately programmed after plugging in the SIM card. SIM cards may also be programmed to display custom menus for personalized services.

A universal SIM (USIM) card is inserted into a mobile station for Wideband Code Division Multiple Access (W-CDMA) or Time Division-Synchronous Code Division Multiple Access (TD-SCDMA) system (also called 3G) telephony communication. The USIM card stores user account information, an IMSI, authentication information and a set of USIM Application Toolkit (USAT) commands and provides storage space for text messages and phone book contacts. A Baseband MCU may interact with an MCU of the USIM card (each simply referred to as a USIM MCU hereinafter) to fetch data or SAT commands from the plugged in USIM cards. The phone book on the USIM card is greatly enhanced when compared to the SIM card. For authentication purposes, the USIM card may store a long-term preshared secret key K, which is shared with the Authentication Center (AuC) in the network. The USIM MCU may verify a sequence number that must be within a range using a window mechanism to avoid replay attacks, and is in charge of generating the session keys CK and IK to be used in the confidentiality and integrity algorithms of the KASUMI (also termed A5/3) block cipher in the UMTS. A mobile station is immediately programmed after plugging in the USIM card.

A removable User Identity Module (R-UIM) or a Code Division Multiple Access (CDMA) Subscriber Identity Module (CSIM) card has already been developed for a CDMA mobile station and is similar to the GSM SIM and 3G USIM cards, but capable of working in CDMA networks. The R-UIM or the CSIM card is physically compatible with the GSM SIM card, and provides similar security mechanisms for the CDMA system.

The International Mobile Subscriber Identity (IMSI) is a unique number associated with a global system for mobile communication (GSM) or a universal mobile telecommunications system (UMTS) network user. The IMSI may be sent by a mobile station to a GSM or UMTS network to acquire other details of the mobile user in the Home Location Register (HLR) or as locally copied in the Visitor Location Register (VLR). An IMSI is typically 15 digits long, but may be shorter (for example MTN South Africa's IMSIs are 14 digits). The first 3 digits are the Mobile Country Code (MCC), and they are followed by the Mobile Network Code (MNC), which is either 2 digits (European standard) or 3 digits (North American standard). The remaining digits are the mobile subscriber identification number (MSIN) for a GSM or UMTS network user.

FIG. 1 shows a schematic diagram of a mobile communication network system. In FIG. 1, a mobile station (may be called user equipment interchangeably) 110 with dual subscriber identity cards A and B may simultaneously access the same or different core networks such as Global System for Mobile Communications (GSM), Wideband Code Division Multiple Access (WCDMA), CDMA 2000 and Time Division-Synchronous Code Division Multiple Access (TD-SCDMA) network and the like after camping on two cells 140A and 140B (i.e. each may be a base station, a node-B or others). The subscriber identity card A or B may be a SIM, USIM, R-UIM or CSIM card. The mobile station 110 may make a voice or data call to a called party 120 or 130 through the GSM system with the Base Station Controller (BSC), WCDMA/CDMA2000/TD-SCDMA network with Radio Network Controller (RNC), Public Switched Telephone Network (PSTN) or any combinations thereof using either the subscriber identity cards A or B. For example, the mobile station 110 may make a voice call with the subscriber identity card A to the called party 120 through the cell 140A, an BSC/RNC A and a cell 140C in sequence, or make a voice call with the subscriber identity card B to the called party 120 through the cell 140B, an BSC/RNC B, a core network operator B, a core network operator A, the BSC/RNC A and the cell 140C in sequence. Moreover, the mobile station 110 may receive a phone call request with either of the subscriber identity cards A or B from the calling party 120 or 130. For example, the mobile station 110 may receive a phone call request to the subscriber identity card B from the calling party 130 via a Public Switched Telephone Network (PSTN), the core network operator B, the BSC/RNC B and the cell 140B.

Figure 2:
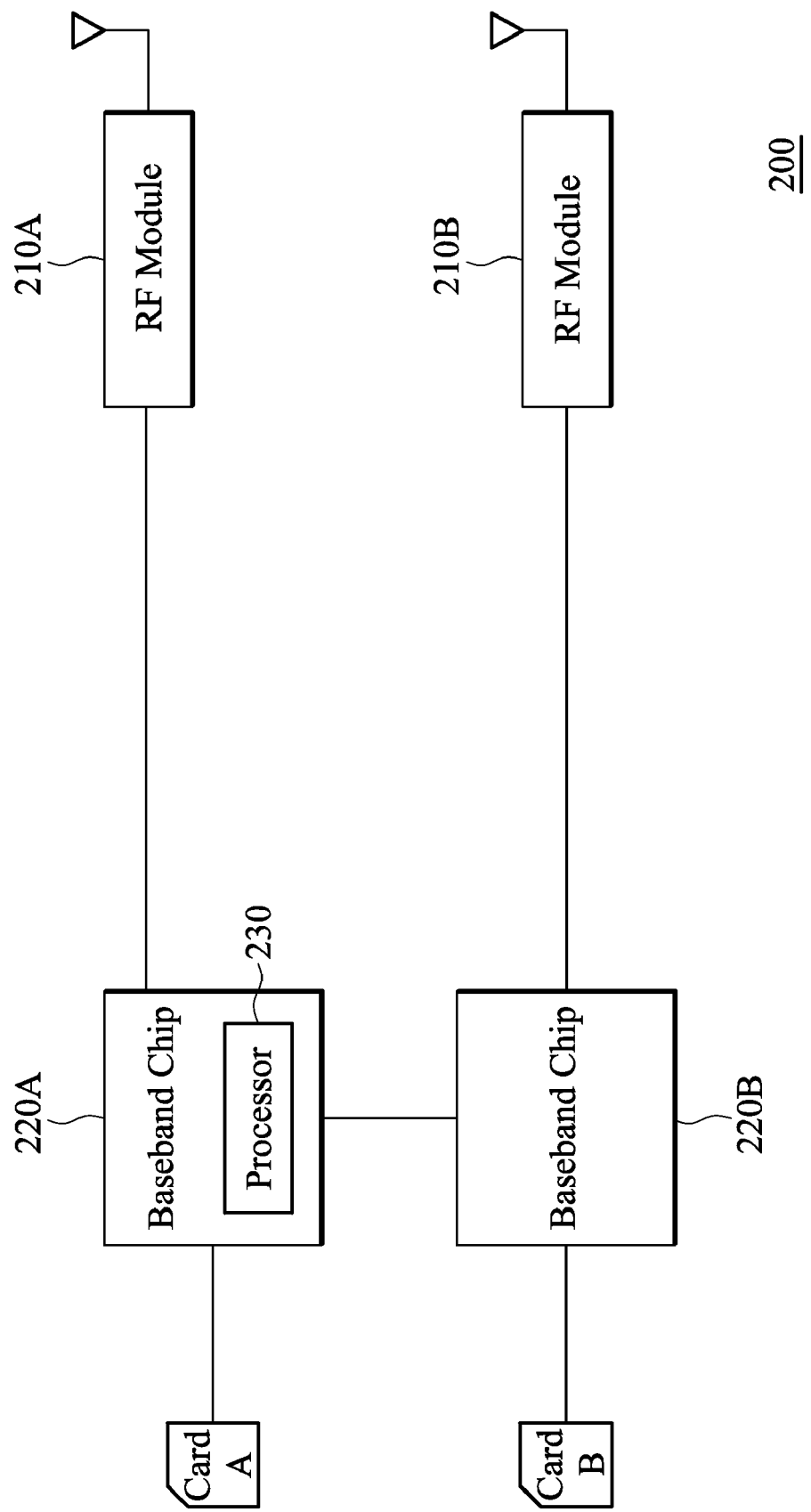
FIG. 2 shows a mobile station according to an embodiment of the invention.

FIG. 2 shows the hardware architecture of a mobile station 200 according to an embodiment of the invention. The mobile station 200 comprises two radio frequency (RF) modules 210A and 210B and two Baseband chips 220A and 220B, wherein the RF module 210A is coupled to the Baseband chip 220A and the RF module 210B is coupled to the Baseband chip 220B. Two subscriber identity cards A and B may be plugged into two sockets of the mobile station 200 connecting to the Baseband chips 220A and 220B respectively, wherein the subscriber identity cards A and B separately uses the RF Modules 210A and 210B to transmit signals to or receive signals from their camped on cell or neighboring cells. Each of the subscriber identity cards A and B may be a SIM, USIM, R-UIM or CSIM card, which is provided by a particular network operator. The mobile station 200 can therefore simultaneously camp on two cells provided by either the same network operator or different network operators for the plugged cards A and B and operate in stand-by/idle modes, or even dedicated modes, using different RF modules and Baseband chips. Each of the Baseband chips 220A and 220B may read data from a particular subscriber identity card A or B and write data to the subscriber identity card A or B. Furthermore, the Baseband chip 220A may be a master device for the mobile station 200, and comprises a processor 230 for controlling the communications between the subscriber identity cards A and B and the RF modules 210A and 210B. A further processor (not shown) may be provided in the Baseband chip 220B to coordinately operate with the processor 230 of the Baseband 220A to improve performance.

An RF module (e.g. 210A or 210B of FIG. 2) receives wireless radio frequency signals and converts the received signals to baseband signals to be processed by a corresponding Baseband chip (e.g. 220A or 220B of FIG. 2), or receives baseband signals from the Baseband chip and converts the received signals to wireless radio frequency signals to be transmitted to a peer device. The RF module may comprise a plurality of hardware devices to perform radio frequency conversion. For example, the RF module may comprise a mixer to multiply the baseband signals with a carrier oscillated in the radio frequency of the wireless communication system, wherein the radio frequency may be, for example, 900 MHz or 1800 MHz for global system for mobile communication (GSM), or 1900 MHz or 2100 MHz for Universal Mobile Telecommunications System (UMTS). The Baseband chip further converts the baseband signals to a plurality of digital signals, and processes the digital signals, and vice versa. The Baseband chip may also comprise a plurality of hardware devices to perform baseband signal processing. The baseband signal processing may comprise analog to digital conversion (ADC), digital to analog conversion (DAC), gain adjustments, modulation/demodulation, encoding/decoding, and so on.

In GSM, one inserted subscriber identity cards of mobile station as shown in FIG. 2 can be operated in idle mode and dedicated mode. Referring to FIG. 1, in idle mode, the mobile station 110 is either powered off, searches for or measures the Broadcast Control Channel (BCCH) with better signal quality from a base station (e.g. the cell 140A or 140B) provided by a specific network operator, or is synchronized to the BCCH of a specific base station to be ready to perform a random access procedure on the Random Access Channel (RACH) to request a dedicated channel. In dedicated mode, the mobile station 110 occupies a physical channel and tries to synchronize therewith, and establishes logical channels and switches throughout them.

Specifically, in GSM, for each inserted subscriber identity card in idle mode, the mobile station 110 continuously listens to the BCCH from a base station and reads the BCCH information and conducts periodic measurements of the signaling strength of the BCCH carriers in order to select a suitable cell to be camped on. In idle mode, no exchange of signaling messages is presented with the network. The data required for Radio Resource Management (RR) and other signaling procedures is collected and stored, such as the list of neighboring BCCH carriers, thresholds for RR algorithms, Common Control Channel (CCCH) configurations, information regarding the use of RACH and Paging channel (PCH), or others. Such kind of information (e.g. system information (SI)) is broadcasted by a base station system on the BCCH and provides information about the network configuration. Moreover, the SI is available for all mobile stations currently in the cell. The SI comprises a Public Land Mobile Network (PLMN) code uniquely owned by a network operator. The PLMN code comprising a Mobile Country Code (MCC) and a Mobile Network Code (MNC), indicate which network operator is providing the communication services. In addition, a cell identity (ID) indicating which cell is broadcasting the BCCH is also contained in the SI. Furthermore, the SI may comprise network identification, neighboring cells, channel availability and power control requirements etc. The PLMN code may be acquired and stored in a corresponding subscriber identity card of the electronic device upon receiving the SI from the BCCH. The Base Station System (BSS) further continuously sends out, on all PCHs of a cell valid Layer 3, messages (PAGING REQUEST) which the mobile station 110 can decode and recognize if its address (e.g. its IMSI of a specific SIM card) is paged. The mobile station 110 periodical monitors the PCHs to avoid loss of paging calls.

Each exchange of signaling messages with the network, e.g. BSS, Mobile Switching Center (MSC) and the similar, requires a Radio Resource Management (RR) connection and the establishment of an LAPDm connection between a mobile station and BSS. Setting up the RR connection can be initiated by the mobile station or network. In either situation, the mobile station sends a channel request (CHAN-QUEST) on the RACH in order to achieve assignment of a channel on the Access Grant Channel (AGCH), also referred to as an immediate assignment procedure. The channel request may be rejected by an immediate assignment reject procedure. If the network does not immediately answer to the channel request, the request is repeated for a certain number of times. In the situation of a network-initiated connection, a procedure is preceded by a paging call (PAGING REQUEST) to be answered by the mobile station (PAGING RESPONSE). After an RR connection has been successfully completed, higher protocol layers, Connection Management (CM) and Mobility Management (MM) can receive and transmit signaling messages.

In contrast to the setup of connections, the release of connections is typically initiated by the network (CHANNEL RELEASE). The release of connections may occur when the signaling transaction ends, there are too many errors, or the channel is removed due to a higher priority call, e.g. an emergency call, or end of a call.

Once an RR connection has been set up, the mobile station has either a Stand-alone Dedicated Control Channel (SDCCH) or a Traffic Channel (TCH) with an associated Slow/Fast Associated Control Channel (SACCH/FACCH) available for exclusive bidirectional use.

Setting up an MM connection from the mobile station presumes the existence of an RR connection, but a single RR connection can be used by multiple MM connections. If the MM connection can be established, the mobile station sends the message CM-SERVICE REQUEST to the network. The message CM-SERVICE REQUEST contains information regarding a mobile subscriber (IMSI or Temporary Mobile Subscriber Identity (TMSI)), where a TMSI has only local significance within a Location Area and must be used together with the Location Area Identity (LAI) for the unique identification of a subscriber, as well as information regarding the requested service (outgoing voice call, short message service SMS transfer, activation or registration of a supplementary service, or others). If the mobile station receives the message CM-SERVICE ACCEPT or local message from the RR sub-layer that enciphering has been activated, it is treated as an acceptance of the service request, and the requesting CM entity is informed about the successful setup of an MM connection. Otherwise, if the service request has been rejected by the network, the mobile station receives a message CM-SERVICE REJECT, and the MM connection cannot be established.

In W-CDMA or TD-SCDMA, one inserted subscriber identity card of mobile station as shown in FIG. 2 can be operated in idle mode and connected mode Referring to FIG. 1, in idle mode, the mobile station selects (either automatically or manually) a PLMN to contact. The mobile station continuously listens to the BCCH to acquire an SI comprising a PLMN code uniquely owned by a network operator. The PLMN code comprising an MCC and an MNC indicates which network operator is providing communication services. In addition, an ID indicating which cell is broadcasting the BCCH is also contained in the SI. The PLMN code may be acquired and stored in a corresponding subscriber identity card of the electronic device upon receiving the SI from the BCCH. The mobile station searches for a suitable cell of the chosen PLMN, chooses that cell to provide available services, and tunes to its control channel, also referred to as "camping on a cell". After camping on a cell in idle mode, the mobile station can receive system information and cell broadcast messages from a node-B (e.g. the cell 140A or 140B). The mobile station stays in idle mode until the node-B transmits a request to establish a Radio Resource Control (RRC) connection. In idle mode, the mobile station is identified by non-access stratum identities such as IMSI, TMSI and Packet-TMSI (P-TMSI) identities.

In the Cell_DCH state of connected mode, a dedicated physical channel is allocated to the mobile station, and the mobile station is known by its serving radio network controller (RNC) on a cell or active set level. The mobile station performs measurements and sends measurement reports according to measurement control information received from the RNC. The mobile station with certain capabilities monitors the Forward Access Channel (FACH) for system information messages. In the Cell_FACH state of connected mode, no dedicated physical channel is allocated for the mobile station, but a Random Access Channel (RACH) and FACH are used instead, for transmitting both signaling messages and small amounts of user plane data. In this state, the mobile station also listens to the Broadcast Channel (BCH) to acquire system information. The mobile station performs cell reselections, and after a reselection the mobile station typically sends a Cell Update message to the RNC, so that the RNC knows the mobile station's location on a cell level. In the Cell_PCH state of a connected mode, the mobile station is known on a cell level in a Serving Radio Network Controller (SRNC), but the mobile station can be reached only via the Paging Channel (PCH). The URA_PCH state of a connected mode is very similar to the Cell_PCH state, except that the mobile station does not execute Cell Update after each cell reselection procedure, but instead reads the UMTS Terrestrial Radio Access Network (UTRAN) Registration Area (URA) identities from the BCH, and only if the URA changes (after cell reselection) does the mobile station inform its location to the SRNC. The mobile station leaves the connected mode and returns to the idle mode when the RRC connection is released or following RRC connection failure.

The establishment of an RRC connection and Signaling Radio Bearers (SRB) between a mobile station and UTRAN (RNC) is initiated by a request from higher layers (non-access stratum) on the mobile station side. In a network-originated case, the establishment is preceded by an RRC Paging message. The UTRAN (RNC) may respond with an RRC Connection Set-up message including a dedicated physical channel assignment for the mobile station (move to the Cell-FACH state), or a command to instruct the mobile station to use common channels (move to the Cell_FACH state).

General Packet Radio Service (GPRS) has been developed in GSM/WCDMA/TD-SCDMA networks. GPRS provides wireless access to packet data networks. Networks based on the Internet Protocol (IP) (e.g. the global Internet or private/corporate intranets) and X.25 networks are supported. Before one of the subscriber identity cards A and B of a mobile station can use the GPRS service, the card of the mobile station attaches to the GPRS network. An ATTACH REQUEST message of the mobile station is sent to a Serving GPRS Support Node (SGSN). The GPRS network then checks if the mobile station is authorized, copies the user profile from the Home Location Register (HLR) to the SGSN, and assigns a Packet Temporary Mobile Subscriber Identity (P-TMSI) to the mobile station. The described procedure is called GPRS Attach.

Figure 3:
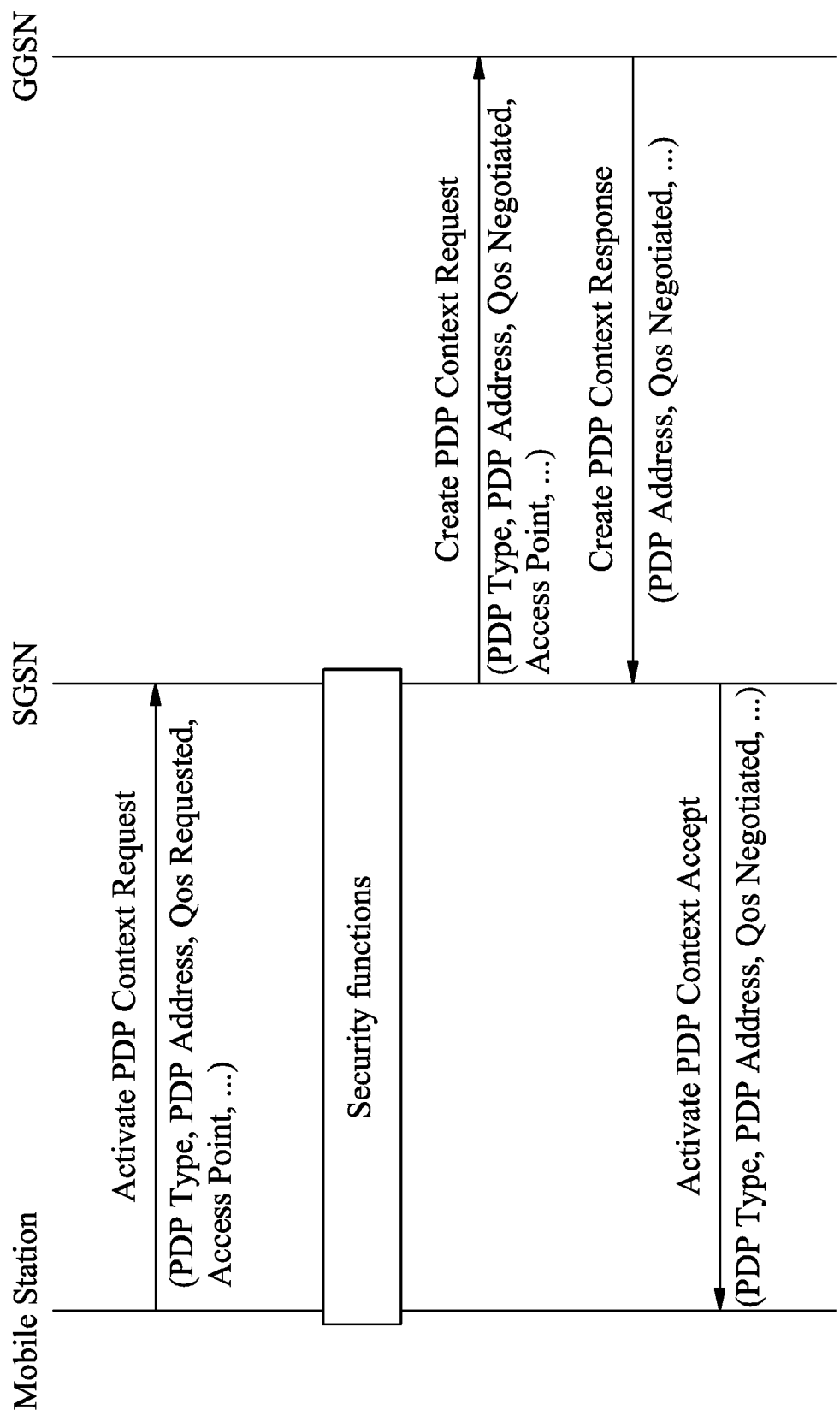
FIG. 3 shows the PDP context activation procedure initialized by the mobile station.

To exchange data packets with external Public Data Networks (PDNs) after a successful GPRS Attach, a mobile station applies for an address used in the PDN. The address is called a Packet Data Protocol (PDP) address. In the case where the PDN is an IP network, the PDP address is an IP address. For each session, a so-called PDP context is created, which describes the characteristics of the session. The PDP context describes the PDP type (e.g. IPv4, IPv6 or others), the PDP address assigned to a mobile station, the requested Quality of Service (QoS) class and the address of a Gateway GPRS Support Node (GGSN) that serves as the access point to the external network. FIG. 3 shows the PDP context activation procedure initialized by the mobile station. Using the message ACTIVATE PDP CONTEXT REQUEST, the mobile station informs the SGSN of the requested PDP context. After that, the typical GSM/W-CDMA/TD-SCDMA security functions (e.g. authentication of the mobile station) are performed. If access is granted, the SGSN will send a CREATE PDP CONTEXT REQUEST to the affected GGSN. The GGSN creates a new entry in its PDP context table, which enables the GGSN to route data packets between the SGSN and the external PDN. The GGSN confirms the request to the SGSN with a message CREATE PDP CONTEXT RESPONSE. Finally, the SGSN updates its PDP context table and confirms the activation of the new PDP context to the mobile station (ACTIVATE PDP CONTEXT ACCEPT). For a mobile station using both circuit switched and packet switched services, it is possible to perform combined GPRS/IMSI attachment procedures. The disconnection from the GPRS network is called GPRS Detach. It can be initiated by the mobile station or by the GPRS network.

Internet Protocol (IP) packets are transmitted within the GPRS backbone network. The transmissions are achieved using the GPRS Tunneling Protocol (GTP); that is, GTP packets carry the user's IP packets. The GTP is defined both between the GPRS Supports Nodes (GSNs) within the same PLMN and between the GSNs of different PLMNs. It contains procedures in the transmission plane as well as in the signaling plane. In the transmission plane, the GTP employs a tunnel mechanism to transfer user data packets. In the signaling plane, the GTP specifies a tunnel control and management protocol. The signaling is used to create, modify, and delete tunnels. A Tunnel Identifier (TID), which is composed of the IMSI of the subscriber identity card A or B and a Network Layer Service Access Point Identifier (NSAPI) uniquely, indicates a PDP context. Below the GTP, the transmission control protocol (TCP) or the user datagram protocol (UDP) is employed to transport the GTP packets within the backbone network. In the network layer, the IP is employed to route the packets through the backbone.

Taking GSM system as an example, after one subscriber identity card of the mobile station successfully attaches to the GPRS network, a cell supporting the GPRS application may allocate physical channels for GPRS traffic. In other words, the radio resources of a cell are shared by the subscriber identity card of the mobile station.

Figure 4:
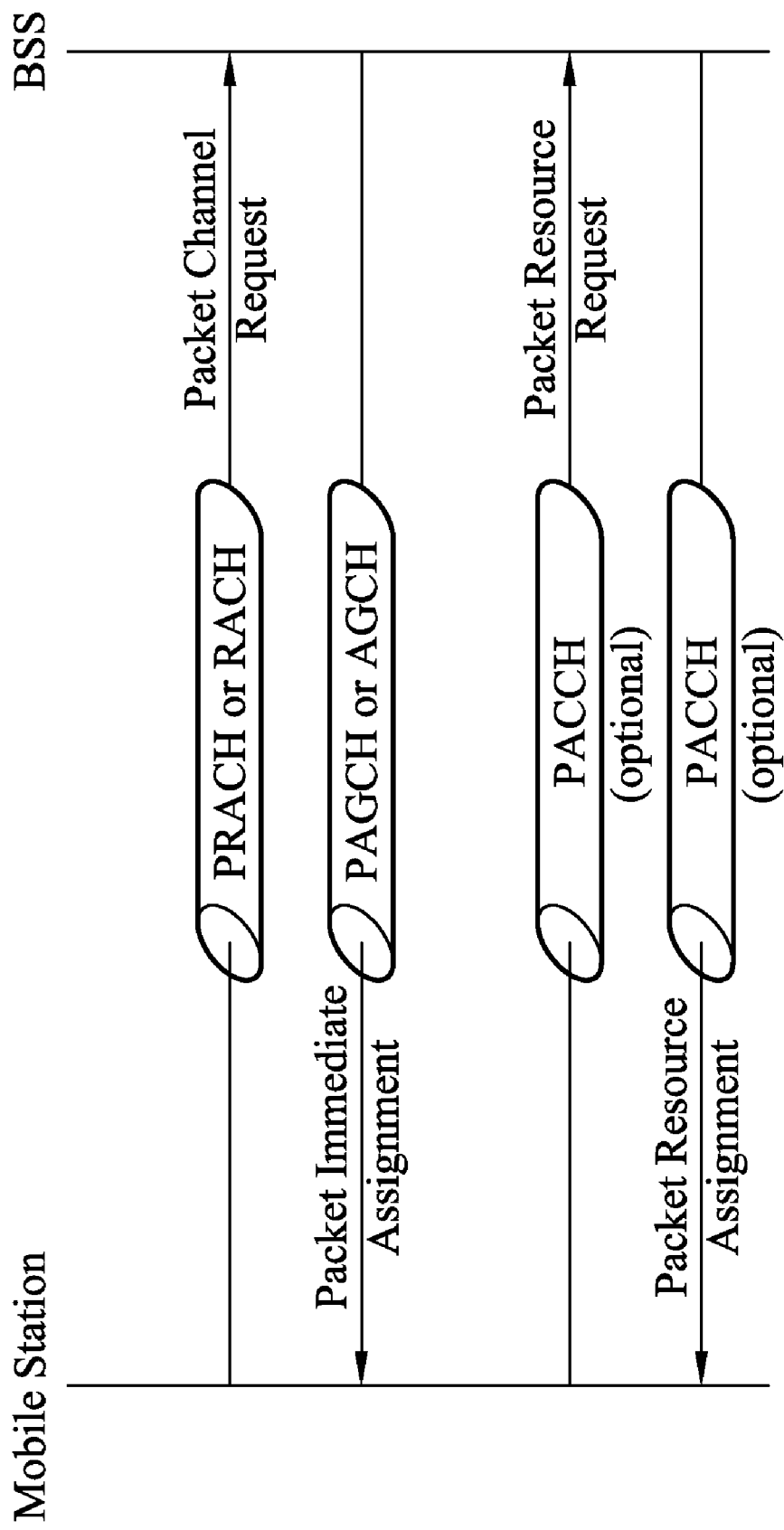
FIG. 4 shows uplink channel allocation (mobile originated packet transfer)

FIG. 4 shows an exemplary uplink channel allocation (mobile originated packet transfer) of the invention. The attached subscriber identity card of the mobile station requests a channel by sending a PACKET CHANNEL REQUEST on the Packet Random Access Channel (PRACH) or RACH. The BSS answers on the Packet Access Grant Channel (PAGCH) or AGCH. Once the PACKET CHANNEL REQUEST is successful, a so-called Temporary Block Flow (TBF) is established. After the TBF is established, resources (e.g. Packet Data Traffic Channel (PDTCH) and buffers) are allocated for the attached subscriber identity card of the mobile station, and data transmission can start. During transfer, the Uplink State Flag (USF) in the header of the downlink blocks indicates to other mobile stations that the uplink PDTCH is already in use. On the receiver side, a Temporary Flow Identifier (TFI) is used to reassemble the packet. Once all data has been transmitted, the TBF and the resources are released.

Figure 5:
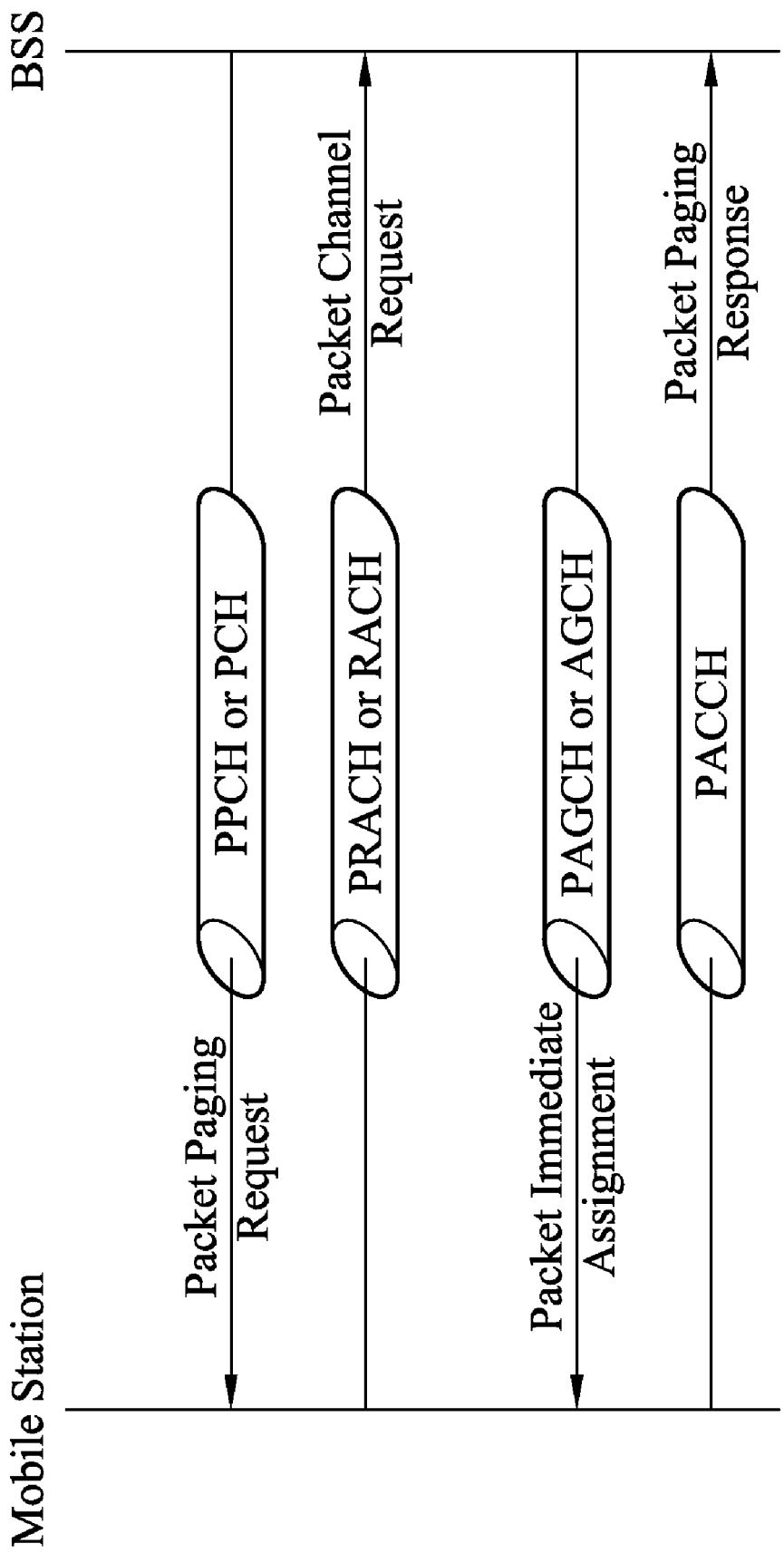
FIG. 5 shows an exemplary paging procedure for a subscriber identity card of a mobile station (mobile terminated packet transfer)

FIG. 5 shows an exemplary paging procedure for a subscriber identity card of a mobile station (mobile terminated packet transfer) of the invention. The BSS pages the attached subscriber identity card of the mobile station by sending a PACKET PAGING REQUEST on the Packet Paging Channel (PPCH) or PCH. The attached subscriber identity card of the mobile station answers on the Packet Random Access Channel (PRACH) or RACH.

Figure 6:
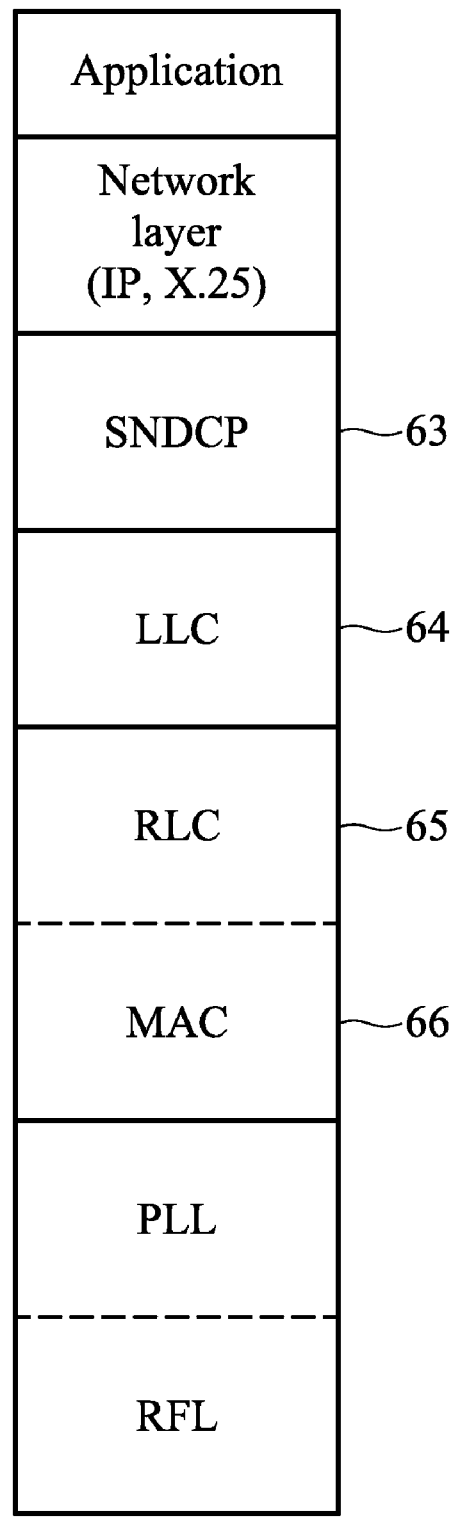
FIG. 6 shows an exemplary protocol architecture for the transmission plane of the GSM network, utilized by a mobile station with a subscriber identity card.

FIG. 6 shows an exemplary protocol architecture for the transmission plane of the GSM network, utilized by a mobile station with a subscriber identity card of the invention. The Subnetwork Dependent Convergence Protocol (SNDCP) layer 63 is used to transfer IP packets between the mobile station and its assigned SGSN. IP packets may contain at least HyperText Transfer Protocol (HTTP), Wireless Application Protocol (WAP), File Transfer Protocol (FTP), Simple Mail Transfer Protocol (SMTP), Post Office Protocol 3 (POP3) or Internet Mail Protocol (IMAP) messages, or others. HTTP is used to request and transmit files, especially Web pages and Web page components, over the Internet or other computer network. WAP is a standard for providing cellular phones, pagers and other handheld devices with secure access to e-mail and text-based Web pages. FTP is used to transfer files on the Internet between client computers and file servers, where files may be transferred, downloaded, and uploaded individually or in batch form. SMTP defines the message format and the message transfer agent (MTA), which stores and forwards e-mail messages. POP3 and IMAP are the two common mailbox access protocols used for Internet e-mail. POP3 is a standard interface between an e-mail client program and the mail server. POP3 provides a message storage area that holds incoming e-mails until users log in and download the e-mails. IMAP is an Internet standard for directly reading and manipulating e-mail messages stored on remote servers. The Logical Link Control (LLC) layer 64 provides a reliable logical link between the MS and its assigned SGSN. The purpose of the Radio Link Control (RLC) layer 65 is to establish a reliable link between the mobile station and the Base Station System (BSS). The operations of the RLC layer 65 include the segmentation and reassembly of the LLC frames into the RLC data blocks. The Medium Access Control (MAC) layer 66 controls the access attempts of the mobile station on the radio channel. The MAC layer 66 employs algorithms for contention resolution of access attempts, statistical multiplexing of channels and a scheduling and prioritizing scheme, which takes the negotiated QoS into account. The MAC protocol additionally allows a single mobile station to simultaneously use several physical channels (i.e. several times slots of the same TDMA frame). The MAC protocol also controls statistical multiplexing. That is, it controls how several mobile stations can access the same physical channel (the same time slot of successive TDMA frames).

Figure 7:
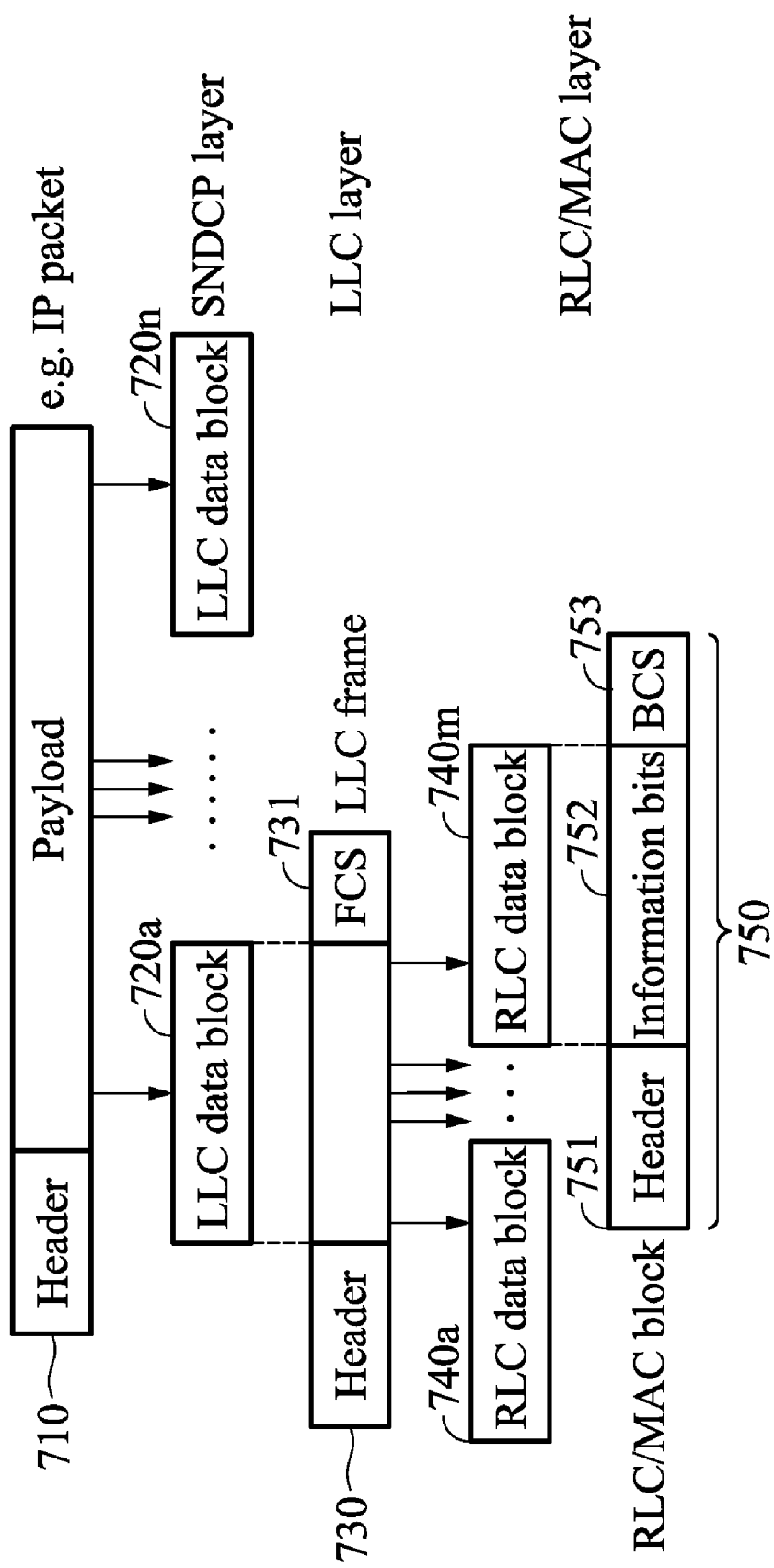
FIG. 7 shows data flow between the protocol layers shown in FIG. 6 in the mobile station.

FIG. 7 shows data flow between the protocol layers shown in FIG. 6 in the mobile station. At least one IP packet 710 is passed down to the SNDCP layer 63, where it is segmented to LLC data blocks 720a to 720n. After adding header information and a Frame Check Sequence (FCS) 731 for error protection, the LLC frames 730 are segmented into one or several RLC data blocks 740a to 740m, and then passed down to the MAC layer 66. Each RLC/MAC block 750 contains a MAC and RLC header 751, the RLC payload ("information bits") 752, and a Block Check Sequence (BCS) 753 at the end.

Figure 8:
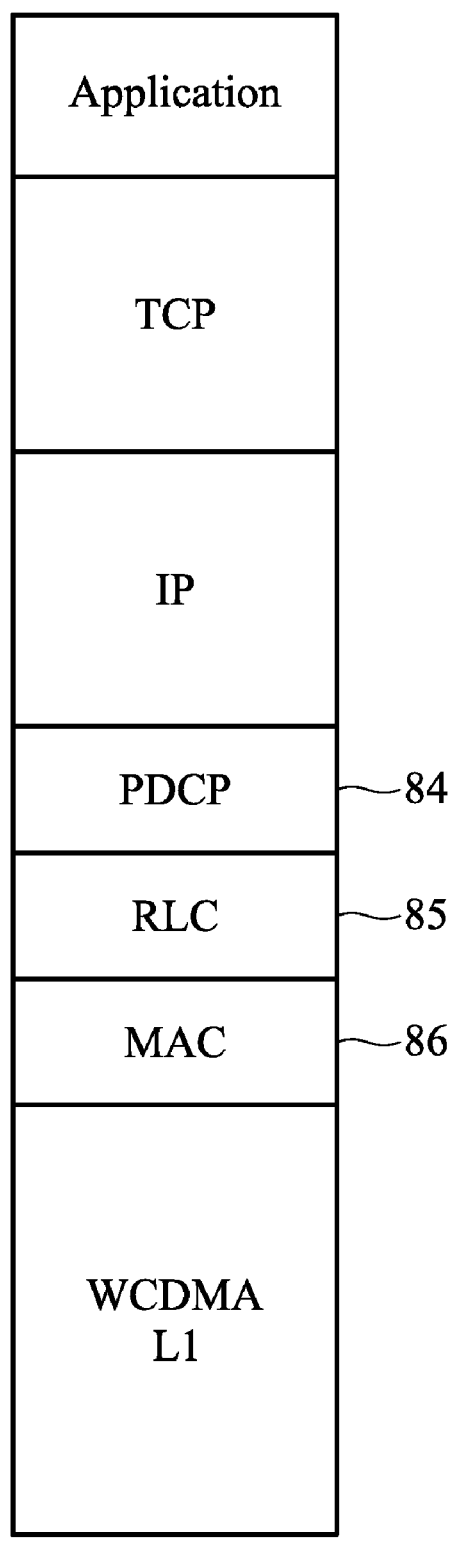
FIG. 8 shows an exemplary protocol architecture for the user plane of the WCDMA/TD-SCDMA network, utilized by a mobile station with a subscriber identity card.

FIG. 8 shows an exemplary protocol architecture for the user plane of the WCDMA/TD-SCDMA network, utilized by a mobile station with a subscriber identity card of the invention. The Medium Access Control (MAC) layer 86 offers services to the radio link control (RLC) layer 85 by means of logical channels. The logical channels are distinguished by types of data being transmitted. The RLC layer 85 offers services to higher layers via service access points (SAPs), which describe how the RLC layer 85 handles the data packets. On the user plane, the RLC services are used either by the service-specific protocol layers, Packet Data Convergence Protocol (PDCP) 84. The Packet Data Convergence Protocol (PDCP) is presented for the Packet Switching (PS) domain services. A main function of the PDCP is header compression.

Figure 9:
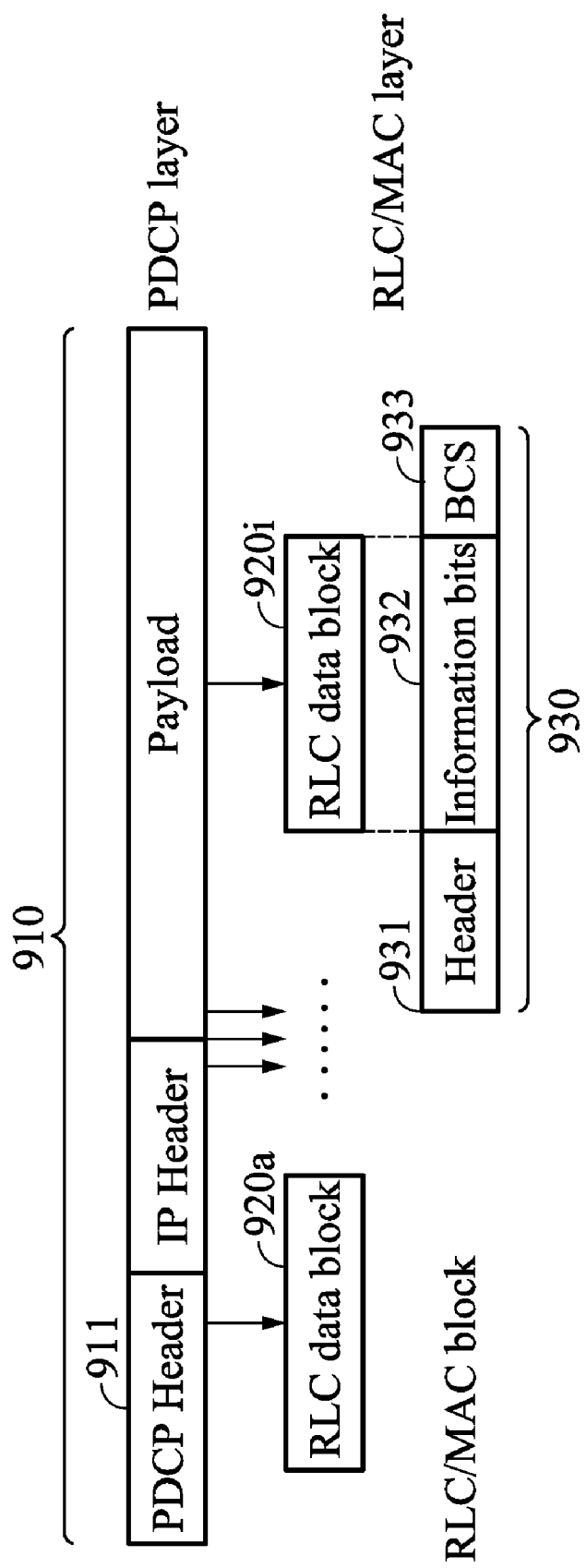
FIG. 9 shows data flow between the protocol layers shown in FIG. 8 in the mobile station.

FIG. 9 shows data flow between the protocol layers shown in FIG. 8 in the mobile station. IP packets are passed down to the PDCP layer 84 to add header information. IP packets may contain at least HTTP, WAP, FTP, SMTP, POP3 or IMAP messages, or others. After adding header information 911, the PDCP frames 910 are segmented into one or several RLC data blocks 920a to 920i, and then passed down to the MAC layer 86. Each RLC/MAC block 930 contains a MAC and RLC header 931, the RLC payload ("information bits") 932, and a Block Check Sequence (BCS) 933 at the end.

Figure 10:
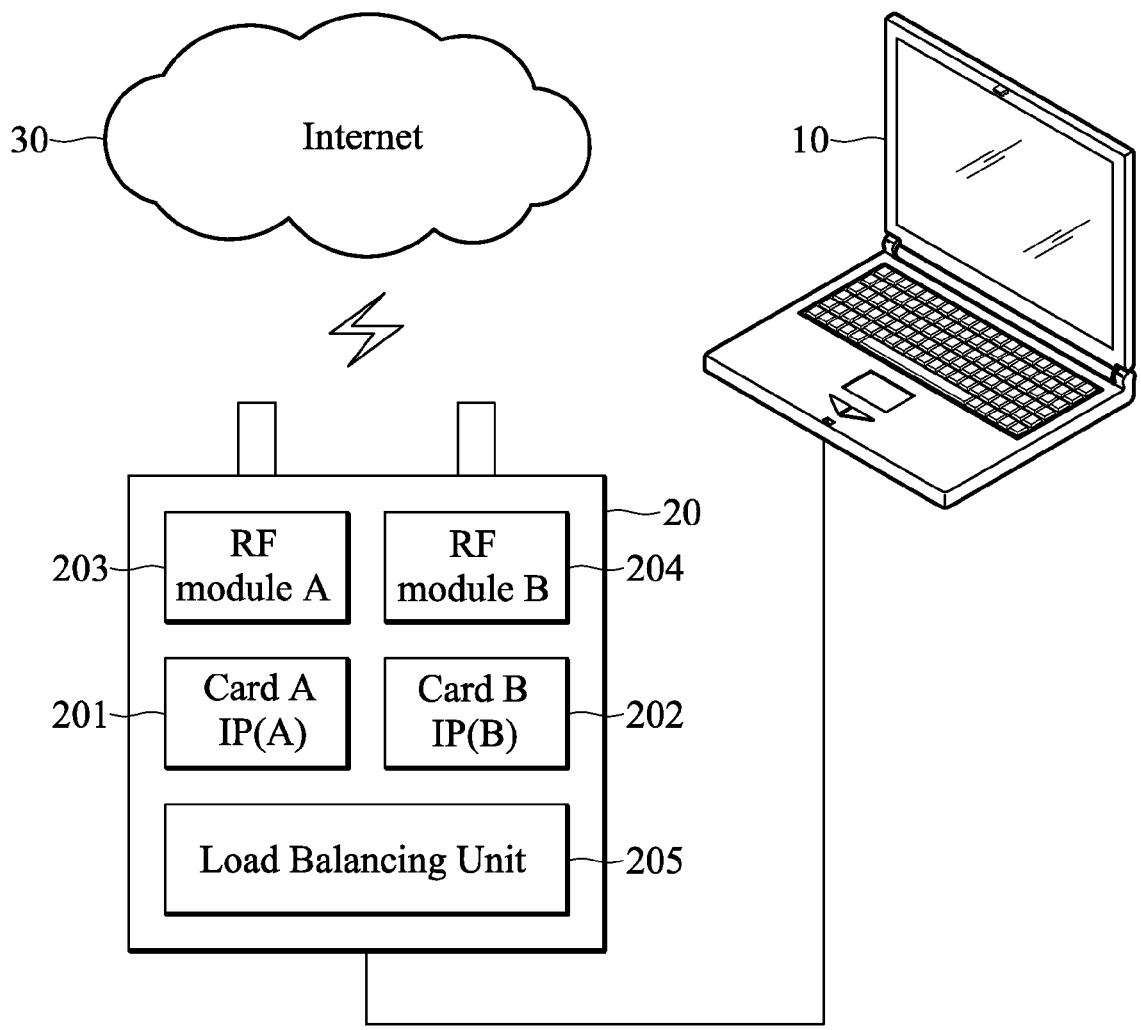
FIG. 10 shows a schematic diagram illustrating a computer host accessing the internet via a mobile station.

FIG. 10 shows a schematic diagram illustrating a computer host 10 attempting to access the Internet 30 via a mobile station 20. In FIG. 10, the mobile station 20 is coupled to the computer host 10 through a wire/wireless connection, such as a Universal Serial Bus (USB) connection, a bluetooth (BT) connection and so on. Referring to FIG. 10 and FIG. 2 together, with dual subscriber identity cards, denoted as the Card A 201 and the Card B 202, each corresponding to a dedicated RF module, denoted as the RF module A 203 and the RF module B 204, a load balancing unit 205 is introduced in an embodiment of a system for handling packet-switched (PS) data transmissions with two or more subscriber identity cards. The load balancing unit 205 may be implemented in software code to be executed by one or more micro control units (MCUs, e.g. 230 of FIG. 2), dedicated hardware circuits, or a combination thereof. Each MCU may be installed in one of the Baseband chips (e.g. 220A and 220B of FIG. 2) or outside of the Baseband chips. Before actual data transmission, the Card A 201 and the Card B 202 may register at the same or different wireless telecommunication networks, respectively, such as GSM, WCDMA, TD-SCDMA network and the like, and camp on the same or different cells governed by BSSs, node-Bs and the like. Moreover, the Card A 201 and the Card B 202 may obtain the IP addresses, namely IP(A) and IP(B), respectively after PDP Context Activation procedures as shown in FIG. 3. The computer host 10, such as computers, notebooks, portable electronic devices or others, or the mobile station 20 may employ the IP(A) as its own IP address for accessing an Internet resource 30, so that the IP(A) is considered to be the address of the computer host 10 or the mobile station 20 and the Card A 201 and the RF module A 203 are considered as a default subscriber identity card and a default RF module, respectively. Or, another IP address, namely IP(X), may be assigned to the computer host 10 or the mobile station 20 as its own IP address, and the IP(X) presented in the uplink or downlink packets is to be properly modified with IP(A) or IP(B) according to the decisions of a load balancing unit of the mobile station 20, where operations of the load balancing unit will be discussed in the following paragraphs.

Figure 11:
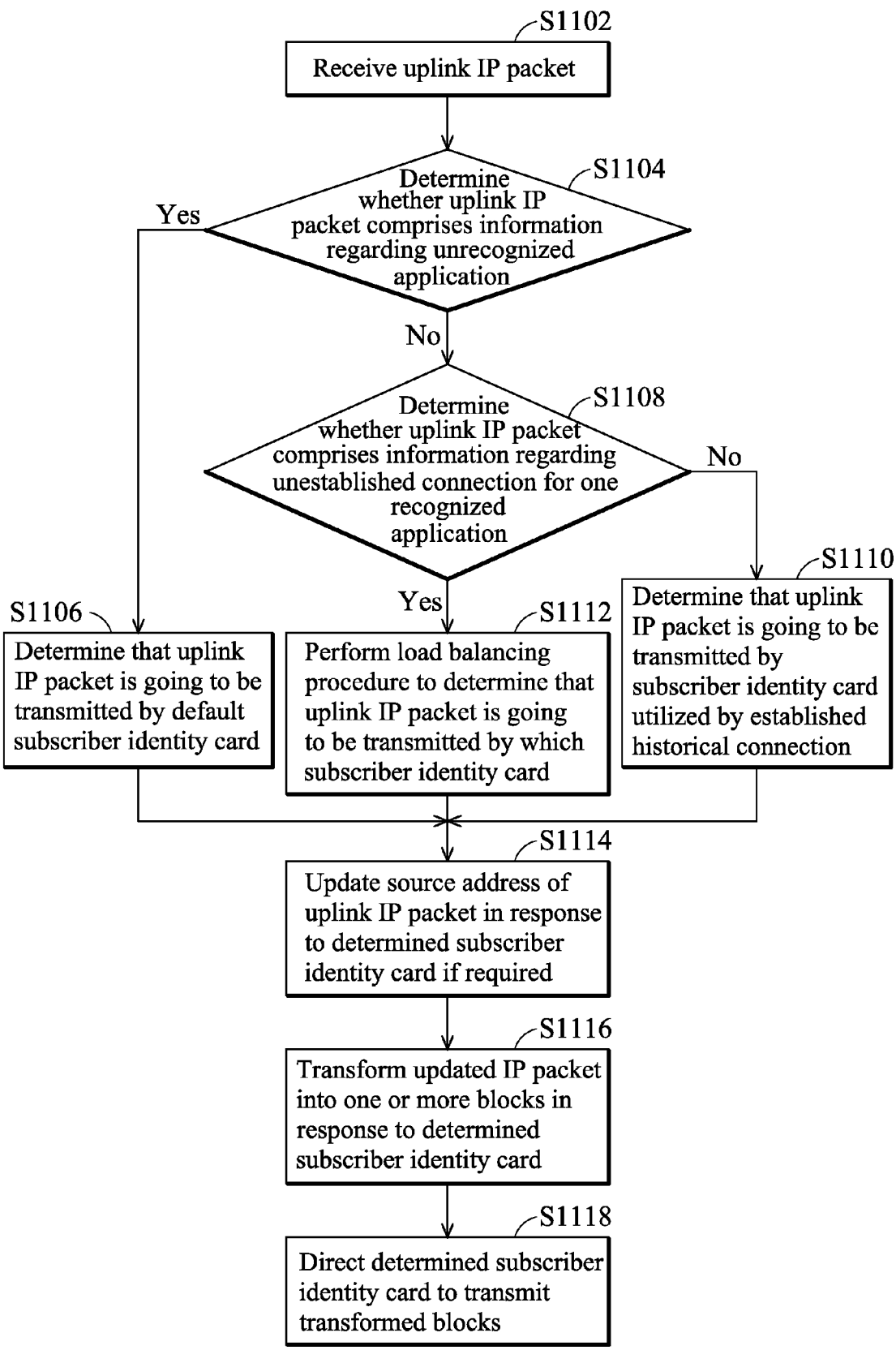
FIG. 11 shows a flow chart illustrating a method for handling packet-switched data transmissions, performed by a load balancing unit of a mobile station with two subscriber identity cards A and B according to an embodiment of the invention.
Figure 12A:
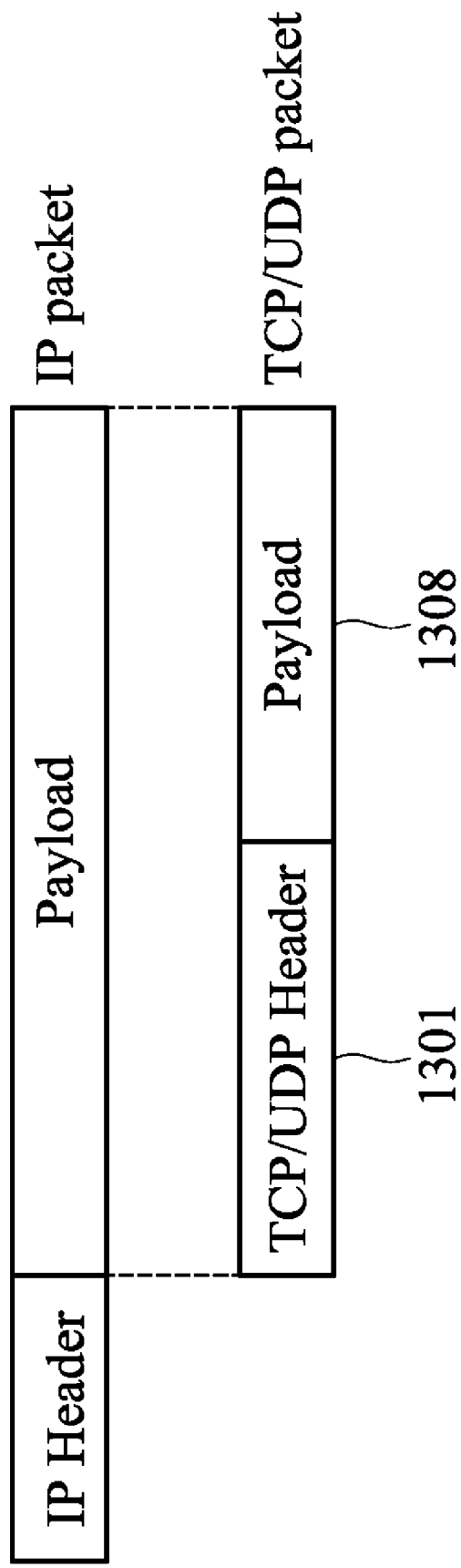
FIG. 12A shows data flow for an Internet Protocol (IP) packet which has a destination port number presented in the transmission control protocol/user datagram protocol (TCP/UDP) header.
Figure 12B:
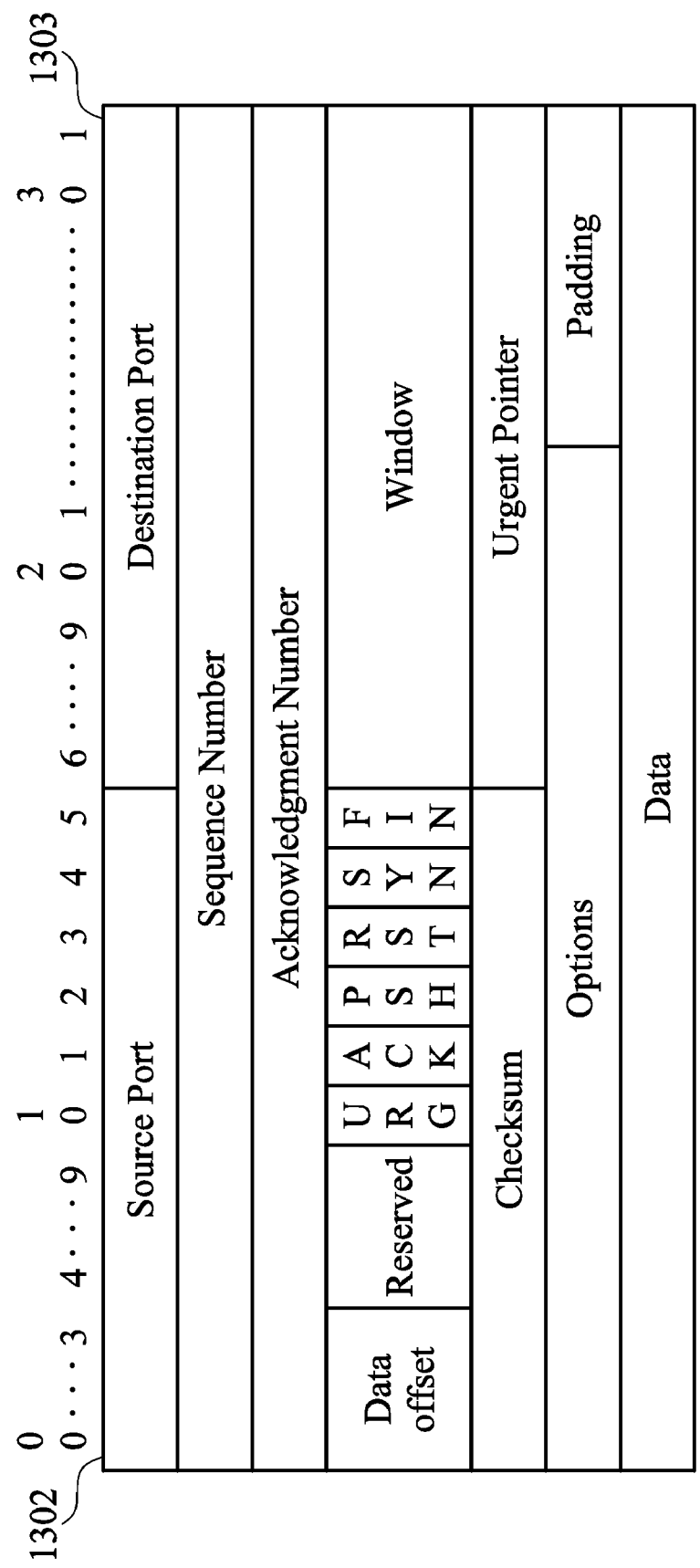
FIG. 12B shows a TCP Header and Payload Format of the IP packet shown in FIG. 12A.
Figure 12C:
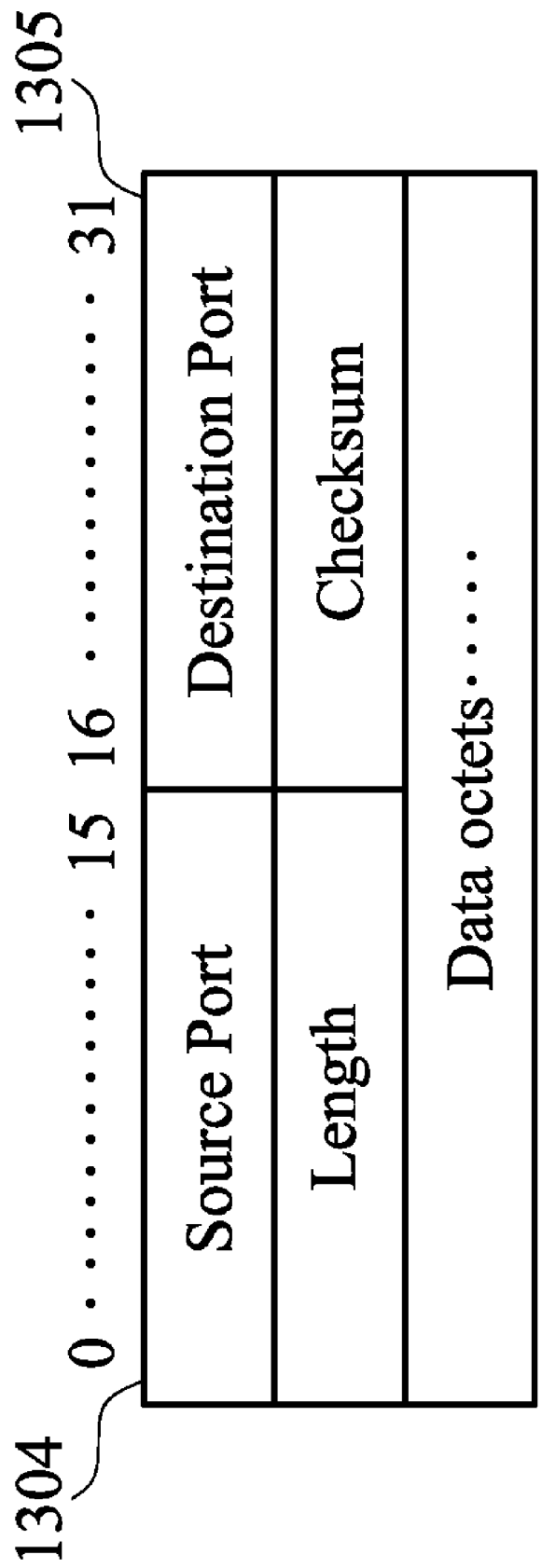
FIG. 12C shows a UDP Header and Payload Format of the IP packet shown in FIG. 12A.
Figure 12D:
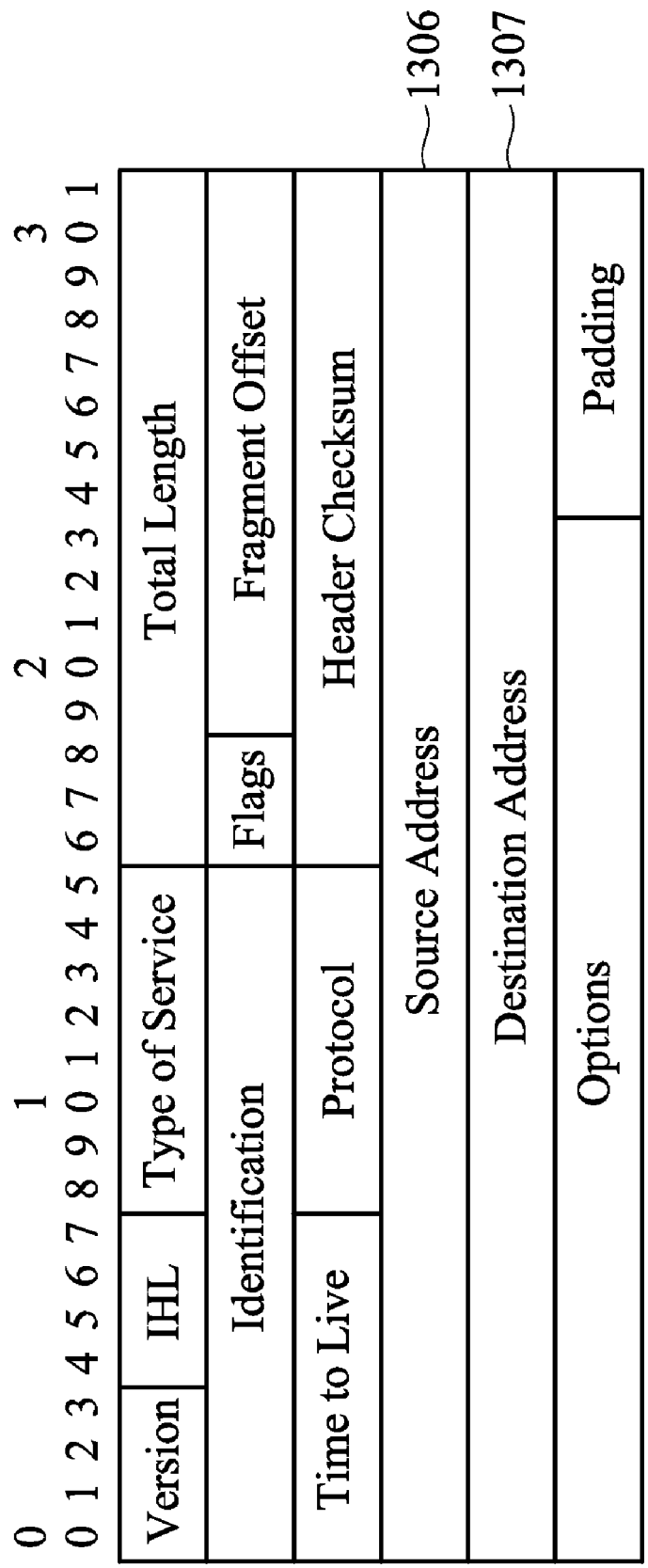
FIG. 12D shows a IP Header Format of the IP packet shown in FIG. 12A.

FIG. 11 shows a flow chart illustrating a method for handling packet-switched data transmissions, performed by a load balancing unit of a mobile station with two subscriber identity cards A and B according to an embodiment of the invention, wherein the subscriber identity cards A and B corresponds to the RF modules A and B, respectively, as shown in FIG. 10 or 2. The load balancing unit may be implemented in dedicated circuits or program code run in a processing unit (e.g. 230 of FIG. 2). First, in step S1102, an uplink IP packet is received from a computer host or a man-machine interface of the mobile station. Next, it is determined whether the uplink IP packet comprises information regarding an unrecognized application that never be served before (step S1104). If so, it is determined that the uplink IP packet is going to be transmitted by a default subscriber identity card (step 1106). If not, it is further determined whether the uplink IP packet comprises information regarding an unestablished connection for one recognized application that was previously served by the mobile station (step S1108). A connection is composed of a source address, a source port number, a destination address and a destination port number. The load balancing unit may retrieve a TCP/UDP packet or others from the payload of the uplink IP packet, as shown in FIGS. 12A-12D, and acquires information regarding an application and/or a connection. FIGS. 12B-12D illustrate an exemplary TCP header and payload format, an exemplary UDP header and payload format and an exemplary IP header format respectively. In an example, the source and destination addresses 1306 and 1307 may be acquired from the IP header and the source port numbers 1302/1304 and the destination port numbers 1303/1305 may be acquired from the TCP/UDP header 1301. Exemplary mappings between port numbers and service types are shown in FIG. 13. The mappings may be implemented in an array, a linked list, or others, and stored in a non-volatile/volatile memory device of the mobile station. It is to be understood that the application can be identified through the stored mappings. Moreover, when the encapsulated source and destination port numbers are not found in the stored mappings, the application is considered to be unrecognized.

When the uplink IP packet is going to be transmitted by the default subscriber identity card (step S1106), the load balancing unit may update a source address 1306 of the header of the uplink IP packet if required (step S1114). For example, when the subscriber identity card A is considered as the default subscriber identity card, a source address of the header of the uplink IP packet is updated with the IP(A). Subsequently, the load balancing unit may transform the uplink IP packet into one or more blocks (step S1116) and direct the default subscriber identity card and the RF module corresponding to the default subscriber identity card to transmit the transformed blocks to a destination via the correspondingly camped on cell and registered wireless telecommunication network (step S1118). For detail concerning transformation of the uplink IP packet into one or more blocks by the load balancing unit, reference may be made to previous descriptions of FIG. 7 or 9.

The load balancing unit may retrieve the established connections stored in the non-volatile/volatile memory device of the mobile station, which may be implemented in an array, a linked list, or others, and then may determine that the uplink IP packet has an unestablished connection when a combination of the source and destination addresses 1306 and 1307 and the source and destination port numbers 1302/1304 and 1303/1305 is absent in any of the established connections. For example, exemplary established connections are shown in FIG. 14, as the mobile station obtains an IP address "192.192.1.128" during PDP context activation with the subscriber identity card A. In addition to the source and destination IP addresses 1306 and 1307 and source and destination port numbers 1302/1304 and 1303/1305, each established connection record further stores information indicating which subscriber identity card was previously utilized to transmit IP packets related to a particular connection. It is to be understood that the established connections may be collected, referring to the determinations shown in step S1106, S1110 or S1112, for a past time period, such as 10 minutes, 30 minutes, 1 hour or others.

Referring to FIG. 11, after determining that the uplink IP packet corresponds to a connection was been established earlier (step S1108), the load balancing unit determines that the uplink IP packet is going to be transmitted by the subscriber identity card utilized by the established connection of the non-volatile/volatile memory device (step S1110). For example, given established connection records shown in FIG. 14, it is determined that the uplink IP packet is going to be transmitted by the subscriber identity card A when the uplink IP packet containing a source IP address "192.192.1.128", a source port number "80", a destination IP address "200.1.1.1" and a destination port number "80" is discovered. Next, when the subscriber identity card A is determined, the source IP address of the IP packet header is replaced with the IP(A) if required (step S1114). Next, the load balancing unit transforms the uplink IP packet into one or more blocks (step S1116) and directs the determined subscriber identity card to transmit the blocks to the destination via the correspondingly camped on cell and registered wireless telecommunication network (step S1118). For detail concerning transformation of the uplink IP packet into one or more blocks by the load balancing unit, reference may be made to previous descriptions of FIG. 7 or 9.

Referring to FIG. 11, after determining that the uplink IP packet comprises information regarding an unestablished connection (step S108), the load balancing unit may perform a load balancing procedure to determine which subscriber identity card is responsible for transmitting the uplink IP packet (step S1112). For example, given established connection records shown in FIG. 14, the load balancing procedure is required to be performed when discovering a source IP address "192.192.1.128", a source port number "2948", a destination IP address "172.118.1.5" and a destination port number "2948" from the uplink IP packet. The load balancing procedure is to be described in the following paragraphs. After that, the load balancing unit may update a source address of the header of the uplink IP packet, if required (step S1114). Subsequently, the load balancing unit may transform the uplink IP packet into one or more blocks (step S1116) and direct the RF module corresponding to the determined subscriber identity card to transmit the transformed blocks to the destination via the correspondingly camped on cell and registered wireless telecommunication network (step S1118). For detail concerning transformation of the uplink IP packet into one or more blocks by the load balancing unit, reference may be made to previous descriptions of FIG. 7 or 9.

An embodiment of the load balancing procedure is provided below. When the destination address of the uplink IP packet header has been found in any of the established connections, it is further determined whether any port number presented in the uplink IP packet can be recognized. The recognition may be achieved by inspecting a look up table similar with the mappings shown in FIG. 13. When no port number of the uplink IP packet can be recognized, the load balancing unit determines that the uplink IP packet is going to be transmitted by the default subscriber identity card (i.e. the subscriber identity card A). When any port number of the uplink IP packet is recognized, the load balancing procedure may determine which subscriber identity card will be used to transmit the uplink IP packet with consideration of another rules, which are described in one or more following embodiments.

Figure 15:
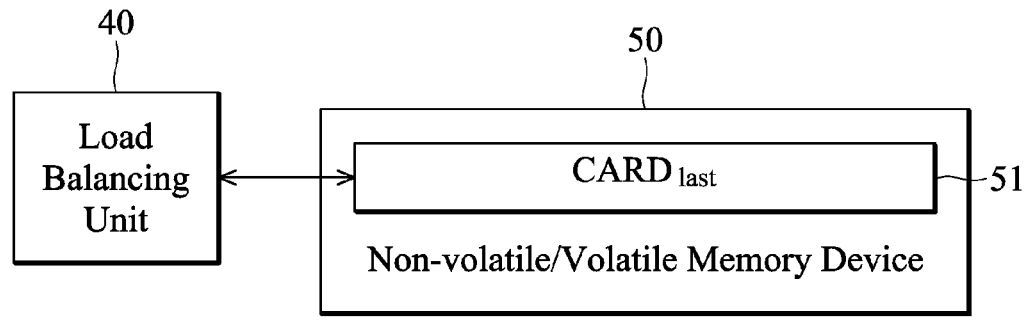
FIG. 15 shows an embodiment illustrating a load balancing method for alternately determining one of the subscriber identity cards A and B to transmit the uplink IP packet.

An embodiment of the load balancing procedure may alternately determine one of the subscriber identity cards A and B to transmit the uplink IP packet for an unestablished connection, also called round-robin scheduling. Referring to FIG. 15, the load balancing unit 40 retrieves information regarding the last utilized subscriber identity card from a non-volatile or volatile memory device 50 of the mobile station, denoted in $CARD_{last}$ 51, and then determines the other subscriber identity card to transmit the uplink IP packet for an unestablished connection. Accordingly, the load balancing unit 40 updates $CARD_{last}$ 51 to indicate the newly determined subscriber identity card.

Figure 16:
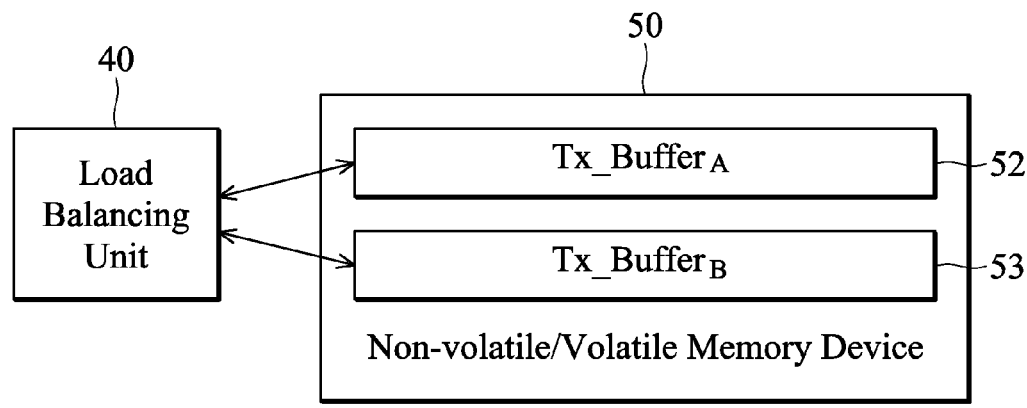
FIG. 16 shows an embodiment illustrating a load balancing method for determining one subscriber identity card to transmit the uplink IP packet according to transmission (Tx) buffer occupancy.

An embodiment of the load balancing procedure may make the decision according to transmission (Tx) buffer occupancy. Referring to FIG. 16, the load balancing unit 40 retrieves information indicating how many data packets are waiting to be sent or retransmitted for the subscriber identity cards A and B by inspecting the Tx buffers of the non-volatile or volatile memory device 50 corresponding to the subscriber identity cards A and B, where Tx buffers of the subscriber identity cards A and B are denoted in $Tx\_Buffer_A$ 52 and $Tx\_Buffer_B$ 53, respectively. The load balancing unit 40 accordingly determines the subscriber identity card with lower Tx buffer occupancy (i.e. having relatively less data packets to be sent or retransmitted) to transmit the uplink IP packet for an unestablished connection.

An embodiment of a load balancing procedure may determine one of the subscriber identity cards A and B, which is not using a circuit-switched (CS) service, for example making a voice call, video call or others, to transmit the uplink IP packet for an unestablished connection. For example, as the subscriber identity card A is currently being used to make a voice call with a corresponding node, the load balancing unit determines the subscriber identity card B and the corresponding RF module B to transmit the uplink IP packet for an unestablished connection.

Figure 17:
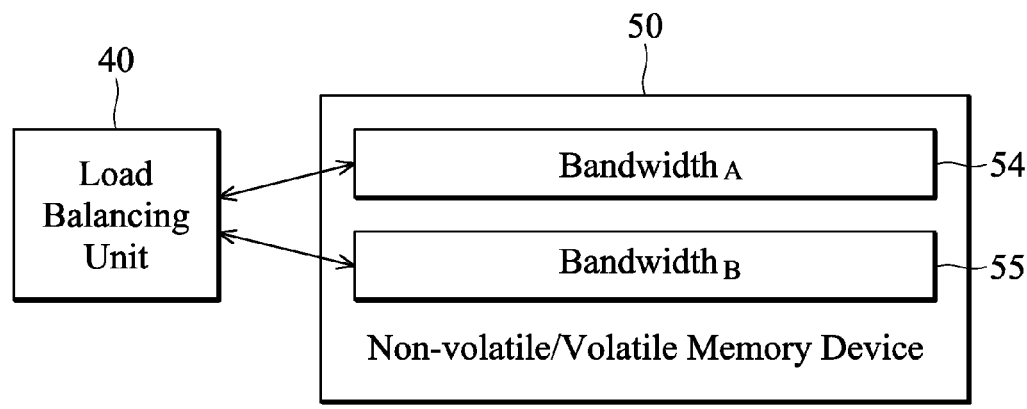
FIG. 17 shows an embodiment illustrating a load balancing method for determining one subscriber identity card to transmit the uplink IP packet according to bandwidths assigned to the subscriber identity cards by the corresponding network operators.

An embodiment of a load balancing procedure may make the decision according to bandwidths of the subscriber identity cards A and B assigned by the corresponding network operators. Information regarding assigned bandwidths may be provided in the RADIO BEARER RECONFIG message, the PACKET UPLINK ASSIGNMENT message, or other messages carried by Dedicated Control Channel (DCCH) by a network operator. It is to be understood the assigned bandwidths may vary from time to time according to the air condition, traffic congestion or others. Referring to FIG. 17, each time acquiring the bandwidth assignment information for the subscriber identity card A or B through the corresponding RF module thereof, the load balancing unit 40 updates the bandwidth assignment information in the non-volatile/volatile memory device 50, denoted in $Bandwidth_A$ 54 or $Bandwidth_B$ 55, for future reference. The load balancing unit 40 retrieves the bandwidth assignment information $Bandwidth_A$ 54 and $Bandwidth_B$ 55 from the non-volatile/volatile memory device 50, and accordingly determines the subscriber identity card that has been assigned to use a relatively higher transmission or reception bandwidth and the corresponding RF module to transmit the uplink IP packet for an unestablished connection. For example, when 64 kbps (bits/bytes per second) is assigned to the subscriber identity card A and 128 kbps is assigned to the subscriber identity card B for uplink transmission, the load balancing unit 40 determines the subscriber identity card B and the corresponding RF module B to transmit the uplink IP packet for an unestablished connection.

Figure 18:
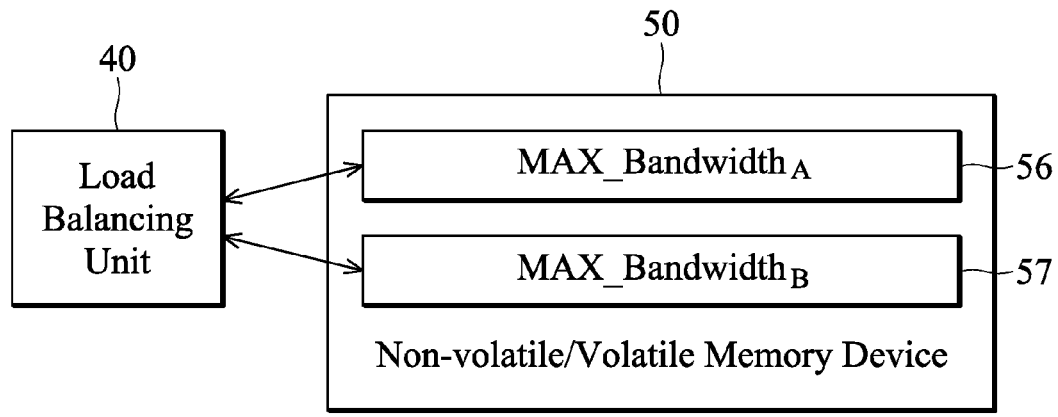
FIG. 18 shows an embodiment illustrating a load balancing method for determining one subscriber identity card to transmit the uplink IP packet according to the maximum bandwidths have been assigned to the subscriber identity cards by the corresponding network operators.

An embodiment of a load balancing procedure may make the decision according to the maximum bandwidths which have or had been assigned to the subscriber identity cards A and B by the corresponding network operators. Referring to FIG. 18, the load balancing unit 40 updates the bandwidth assignment information in the non-volatile/volatile memory device 50 each time the acquired assigned bandwidth is greater than the stored maximum bandwidth, denoted in $MAX\_Bandwidth_A$ 56 or $MAX\_Bandwidth_B$ 57, for future reference. The load balancing unit 40 retrieves the maximum bandwidth assignment information $MAX\_Bandwidth_A$ 56 and $MAX\_Bandwidth_B$ 57 from the non-volatile/volatile memory device 50, and accordingly determines the subscriber identity card with a relatively higher maximum transmission or reception bandwidth to transmit the uplink IP packet for an unestablished connection. For example, when 128 kbps has or had been assigned to the subscriber identity card A and 256 kbps has or had been assigned to the subscriber identity card B for uplink transmission, the load balancing unit 40 determines the subscriber identity card B and the corresponding RF module B to transmit the uplink IP packet for an unestablished connection.

Figure 19:
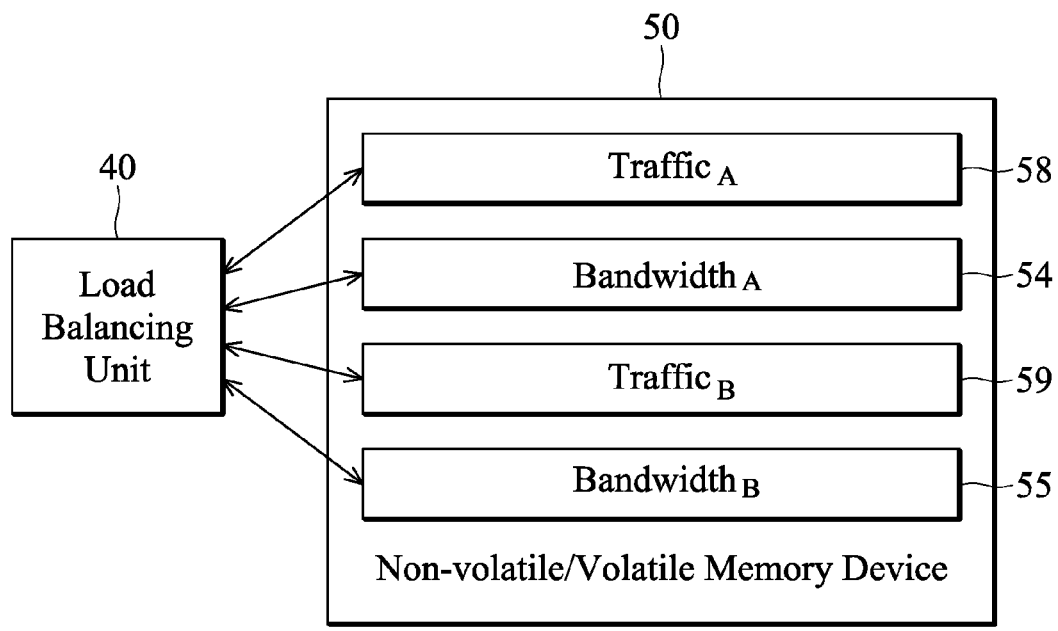
FIG. 19 shows an embodiment illustrating a load balancing method for determining one subscriber identity card to transmit the uplink IP packet according to bandwidths assigned to the subscriber identity cards by the corresponding network operators and current traffic volumes thereof.

An embodiment of a load balancing procedure may make the decision according to bandwidths assigned to the subscriber identity cards A and B and current traffic volumes thereof. Referring to FIG. 19, each time acquiring the bandwidth assignment information for the subscriber identity card A or B through the corresponding RF module thereof, the load balancing unit 40 updates the bandwidth assignment information in the non-volatile/volatile memory device 50, denoted in $Bandwidth_A$ 54 or $Bandwidth_B$ 55, for future reference. Moreover, the load balancing unit 40 continuously monitors traffic volumes of the subscriber identity cards A and B in bits/bytes per second (bps) and updates the traffic volumes in the non-volatile/volatile memory device 50, denoted in $Traffic_A$ 58 or $Traffic_B$ 59, for future reference. The load balancing unit retrieves the bandwidth assignment information $Bandwidth_A$ 54 and $Bandwidth_B$ 55 as well as the traffic volumes $Traffic_A$ 58 and $Traffic_B$ 59 from the non-volatile/volatile memory device 50, and calculates the bandwidth utilization indices $Util_A=(Traffic_A/Bandwidth_A)$ and $Util_B = (Traffic_B/Bandwidth_B)$. After that, the load balancing unit 40 determines the subscriber identity card with a relatively smaller transmission or reception bandwidth utilization index and the corresponding RF module to transmit the uplink IP packet for an unestablished connection.

Note that, the load balancing unit may construct a decision tree by combining at least two of the described embodiments of procedures with relevant conditions, so as to determine one of the subscriber identity cards A and B to transmit the uplink IP packet for an unestablished connection.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A system accompanying with a first subscriber identity card and a second subscriber identity card for handling packet-switched data transmission, wherein the first subscriber identity card camps on a cell via a first RF module and the second subscriber identity card camps on the same cell or a different cell via a second RF module, comprising:
    a load balancing unit receiving an uplink IP packet, determining one subscriber identity card from the first and second subscriber identity cards when the uplink IP packet comprises information regarding an unestablished connection of a recognized application, determining a default subscriber identity card from the first and second subscriber identity cards when all port numbers present in the uplink IP packet are not recognized, determining one subscriber identity card previously utilized when detecting that a former IP packet comprising the same connection as that of the uplink IP packet, and transmitting the uplink IP packet to a destination via the determined subscriber identity card and the RF module corresponding to the determined subscriber identity card,
    wherein the application corresponds to a port number, and the connection is a combination of a source address, a destination address, a source port number and a destination port number of the uplink IP packet.

2. A system accompanying with a first subscriber identity card and a second subscriber identity card for handling packet-switched data transmission, wherein the first subscriber identity card camps on a cell via a first RF module and the second subscriber identity card camps on the same cell or a different cell via a second RF module, comprising:
    a load balancing unit receiving an uplink IP packet, determining one subscriber identity card from the first and second subscriber identity cards when the uplink IP packet comprises information regarding an unestablished connection of a recognized application, and transmitting the uplink IP packet to a destination via the determined subscriber identity card and the RF module corresponding to the determined subscriber identity card; and
    a volatile/non-volatile memory device, storing a plurality of established connection records each indicating a connection had been served by which subscriber identity card,
    wherein the load balancing unit determines whether the uplink IP packet comprises information regarding the unestablished connection of the recognized application according to the established connection records, wherein the load balancing unit determines a default subscriber identity card to transmit the uplink IP packet when detecting that a former IP packet was been transmitted to the same destination address as that of the uplink IP packet and all port numbers of the uplink IP packet are not recognized.

3. The system as claimed in claim 2, wherein the load balancing unit updates a source address of the uplink IP packet in response to the determined subscriber identity card, transforms the updated uplink IP packet into one or more blocks in response to the determined subscriber identity card, and directs the RF module that corresponds to the determined subscriber identity card to transmit the transformed blocks to the destination.

4. The system as claimed in claim 2, wherein the load balancing unit determines that the uplink IP packet is to be transmitted to the destination via a default subscriber identity card when the uplink IP packet comprises information regarding an unrecognized application.

5. The system as claimed in claim 4, further comprising a volatile/non-volatile memory device storing a plurality of port numbers each corresponding to a service type, wherein the load balancing unit determines that the uplink IP packet is to be transmitted to the destination via a default subscriber identity card when all port numbers present in the uplink IP packet are not found in the volatile/non-volatile memory device.

6. The system as claimed in claim 2, wherein the load balancing unit transmits the uplink IP packet to the destination via one subscriber identity card previously utilized to transmit a former IP packet comprising the same connection as that of the uplink IP packet.

7. The system as claim in claim 6, wherein each connection is represented by a combination of a source address, a destination address, a source port number and a destination port number.

8. The system as claimed in claim 7, wherein the load balancing unit determines the subscriber identity card previously utilized for the same connection by inspecting the established connection records.

9. The system as claimed in claim 2, wherein the load balancing unit alternately determines one of the subscriber identity cards to transmit the uplink IP packet for the unestablished connection.

10. The system as claimed in claim 2, further comprising a volatile/non-volatile memory device storing information regarding the last utilized subscriber identity card, wherein the load balancing unit determines one subscriber identity card different from the last utilized subscriber identity card to transmit the uplink IP packet.

11. The system as claimed in claim 2, wherein the load balancing unit determines the subscriber identity card with lower transmission buffer occupancy to transmit the uplink IP packet for the unestablished connection.

12. The system as claimed in claim 11, further comprising:
    a first Tx buffer storing a plurality of IP packets to be sent or retransmitted via the first subscriber identity card; and
    a second Tx buffer storing a plurality of IP packets to be sent or retransmitted via the second subscriber identity card,
    wherein the transmission buffer occupancy of the first or second Tx buffer is determined by inspecting how many data packets are waiting to be sent or retransmitted in the first or second Tx buffer.

13. The system as claimed in claim 2, wherein the load balancing unit determines the subscriber identity card which is not utilized in a circuit-switched service to transmit the uplink IP packet for the unestablished connection.

14. The system as claimed in claim 2, wherein the load balancing unit determines the subscriber identity card with the relatively higher assigned transmission or reception bandwidth to transmit the uplink IP packet for the unestablished connection, wherein each bandwidth is assigned by a network operator.

15. The system as claimed in claim 14, further comprising a volatile/non-volatile memory device storing information regarding a first bandwidth assignment recently assigned to the first subscriber identity card and a second bandwidth assignment recently assigned to the second subscriber identity card, wherein the load balancing unit determines the relatively higher assigned transmission or reception bandwidth by inspecting the stored first and second bandwidth assignments.

16. The system as claimed in claim 14, further comprising a volatile/non-volatile memory device storing information regarding a first bandwidth assignment indicating the maximum bandwidth had or has been assigned to the first subscriber identity card and a second bandwidth assignment indicating the maximum bandwidth had or has been assigned to the second subscriber identity card, wherein the load balancing unit determines the relatively higher assigned transmission or reception bandwidth by inspecting the stored first and second bandwidth assignments.

17. The system as claimed in claim 2, wherein the load balancing unit determines the subscriber identity card with a relatively smaller transmission or reception bandwidth utilization index to transmit the uplink IP packet for the unestablished connection, and each bandwidth utilization indicates the utilized extent of an assigned bandwidth for a corresponding subscriber identity card.

18. The system as claimed in claim 17, wherein each bandwidth utilization index is represented by dividing the traffic volumes for a corresponding subscriber identity card into a bandwidth assignment assigned for the corresponding subscriber identity card.

* * * * *